United States Patent
Pao et al.

(10) Patent No.: US 9,936,393 B2
(45) Date of Patent: Apr. 3, 2018

(54) METHOD OF RADIO RESOURCE SCHEDULING IN UNLICENSED SPECTRUM AND RELATED APPARATUSES USING THE SAME

(71) Applicant: Industrial Technology Research Institute, Hsinchu (TW)

(72) Inventors: Wei-Chen Pao, Hsinchu County (TW); Ching-Wen Cheng, Tainan (TW); Tzu-Jane Tsai, Hsinchu County (TW); Yung-Lan Tseng, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 52 days.

(21) Appl. No.: 14/983,593

(22) Filed: Dec. 30, 2015

(65) Prior Publication Data

US 2016/0234841 A1  Aug. 11, 2016

Related U.S. Application Data

(60) Provisional application No. 62/113,507, filed on Feb. 8, 2015.

(30) Foreign Application Priority Data

Dec. 25, 2015 (TW) .............................. 104143756 A

(51) Int. Cl.
*H04W 72/04* (2009.01)
*H04W 16/14* (2009.01)
*H04W 72/12* (2009.01)

(52) U.S. Cl.
CPC ....... *H04W 16/14* (2013.01); *H04W 72/1226* (2013.01); *H04W 72/1278* (2013.01)

(58) Field of Classification Search
CPC ................................................ H04W 72/0453
See application file for complete search history.

(56) References Cited

U.S. PATENT DOCUMENTS 8,670,780 B2 * 3/2014 Hakola ................. H04W 16/14
455/446
8,855,069 B2 * 10/2014 Lohr ..................... H04L 1/1887
370/328

(Continued)

FOREIGN PATENT DOCUMENTS

| TW | 201517567 | 5/2015 |
|----|-----------|--------|
| WO | 2013087835 | 6/2013 |
| WO | 2014067090 | 5/2014 |

OTHER PUBLICATIONS

"Office Action of Taiwan Counterpart Application," dated Feb. 21, 2017, p. 1-p. 26, in which the listed references were cited.

(Continued)

*Primary Examiner* — Parth Patel
(74) *Attorney, Agent, or Firm* — JCIPRNET

(57) ABSTRACT

The disclosure is directed to a method of radio resource scheduling in an unlicensed spectrum and related apparatuses using the same method. In one of the exemplary embodiments, the method would include not limited to transmitting a node control information which may include an occupancy pattern of a radio resource of the unlicensed spectrum before receiving an occupancy notification; transmitting an equipment control information which comprises the occupancy pattern of the radio resource of the unlicensed spectrum before receiving the occupancy notification; transmitting a packet data by using the radio resource of the unlicensed spectrum before receiving the occupancy notification; and receiving the occupancy notification which informs an availability of the radio resource of the unlicensed spectrum.

25 Claims, 24 Drawing Sheets

(56) References Cited

U.S. PATENT DOCUMENTS

| | | | | |
|---|---|---|---|---|
| 8,934,909 | B2* | 1/2015 | Koskela | H04W 28/08 370/395.41 |
| 2008/0279155 | A1* | 11/2008 | Pratt, Jr. | H04L 12/66 370/336 |
| 2012/0063373 | A1* | 3/2012 | Chincholi | H04L 5/001 370/281 |
| 2012/0082100 | A1* | 4/2012 | Ahmadi | H04W 72/1215 370/329 |
| 2012/0129522 | A1* | 5/2012 | Kim | H04W 72/0426 455/434 |
| 2012/0320874 | A1* | 12/2012 | Li | H04W 48/12 370/331 |
| 2014/0003356 | A1* | 1/2014 | Wang | H04L 5/001 370/329 |
| 2014/0287769 | A1* | 9/2014 | Taori | H04W 74/0808 455/450 |
| 2014/0301351 | A1* | 10/2014 | Gao | H04W 74/08 370/329 |
| 2014/0342745 | A1* | 11/2014 | Bhushan | H04W 28/0289 455/450 |
| 2014/0378157 | A1* | 12/2014 | Wei | H04W 16/14 455/454 |
| 2016/0036617 | A1* | 2/2016 | Luo | H04L 27/2662 375/260 |
| 2016/0095009 | A1* | 3/2016 | Ling | H04W 16/14 370/329 |
| 2016/0174214 | A1* | 6/2016 | Yerramalli | H04W 72/0413 370/329 |
| 2016/0205562 | A1* | 7/2016 | Wei | H04W 16/14 455/454 |
| 2016/0219623 | A1* | 7/2016 | Chien | H04W 74/0808 |
| 2016/0233989 | A1* | 8/2016 | Belghoul | H04L 1/1887 |
| 2016/0337867 | A1* | 11/2016 | Uchino | H04W 16/14 |
| 2017/0079054 | A1* | 3/2017 | Yan | H04W 72/14 |
| 2017/0094681 | A1* | 3/2017 | Takeda | H04W 16/14 |
| 2017/0280341 | A1* | 9/2017 | Nigam | H04W 24/08 |
| 2017/0339717 | A1* | 11/2017 | Futaki | H04W 72/14 |

OTHER PUBLICATIONS

3GPP, "Study on Licensed-Assisted Access to Unlicensed Spectrum," 3GPP TR 36.889 V13.0.0, Jun. 2015, pp. 1-285.

3GPP, "LS reply to RAN2 on HARQ retransmission for LAA," 3GPP TSG RAN WG2 Meeting #89bis, R2-151030, Apr. 20-24, 2015, pp. 1-2.

3GPP, "Revised SID: Study on Licensed-Assisted Access to Unlicensed Spectrum," 3GPP TSG RAN Meeting #66, RP-141817, Dec. 8-11, 2014, pp. 1-8.

3GPP, "Further Analysis of HARQ Operation in LAA," 3GPP TSG RAN WG2 Meeting #89bis, R2-151179, Apr. 20-24, 2015, pp. 1-4.

3GPP, "Analysis of the Impact of Discontinuous Transmission on User Plane in LAA," 3GPP TSG-RAN WG2 Meeting #89, R2-150244, Feb. 9-13, 2015, pp. 1-4.

3GPP, "Evaluation results for LAA and LAA coexistence with DL-Only LAA," 3GPP TSG RAN WG1 Meeting #81, R1-152987, May 25-29, 2015, pp. 1-4.

* cited by examiner

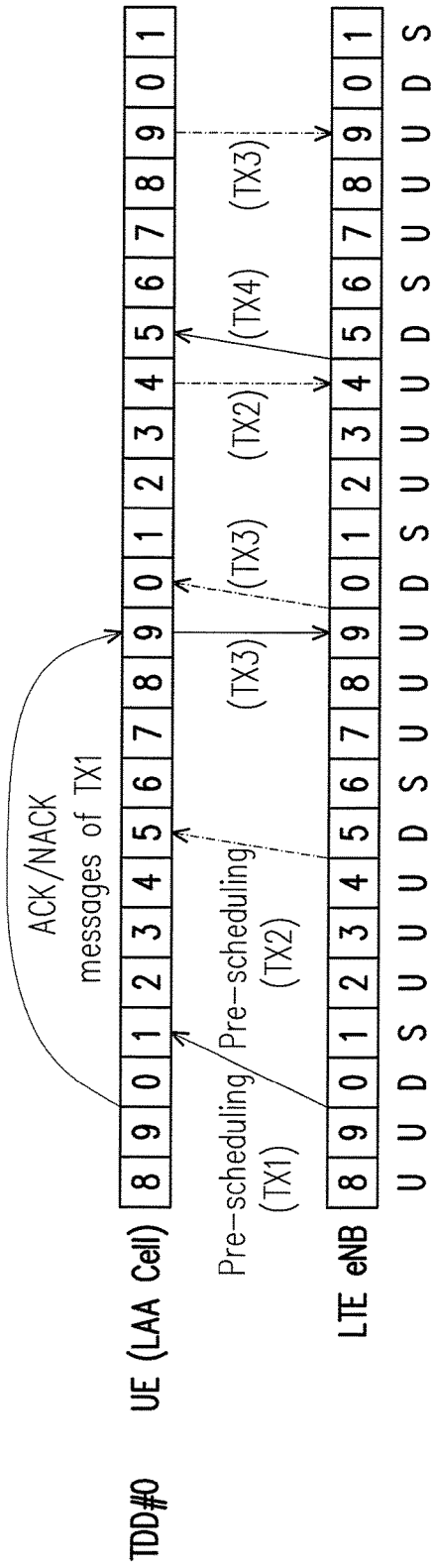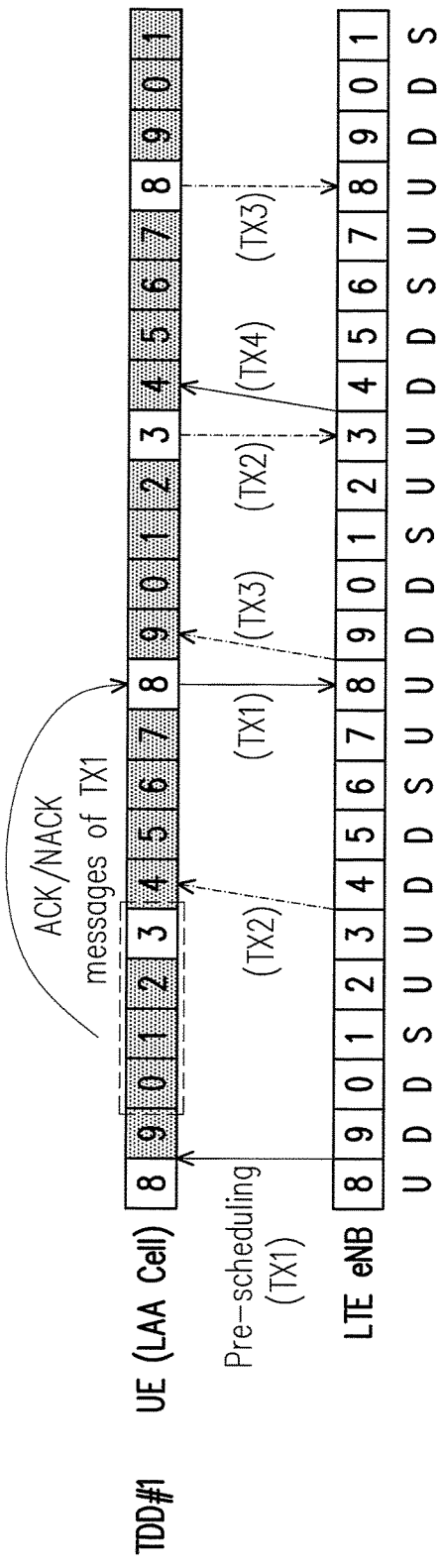

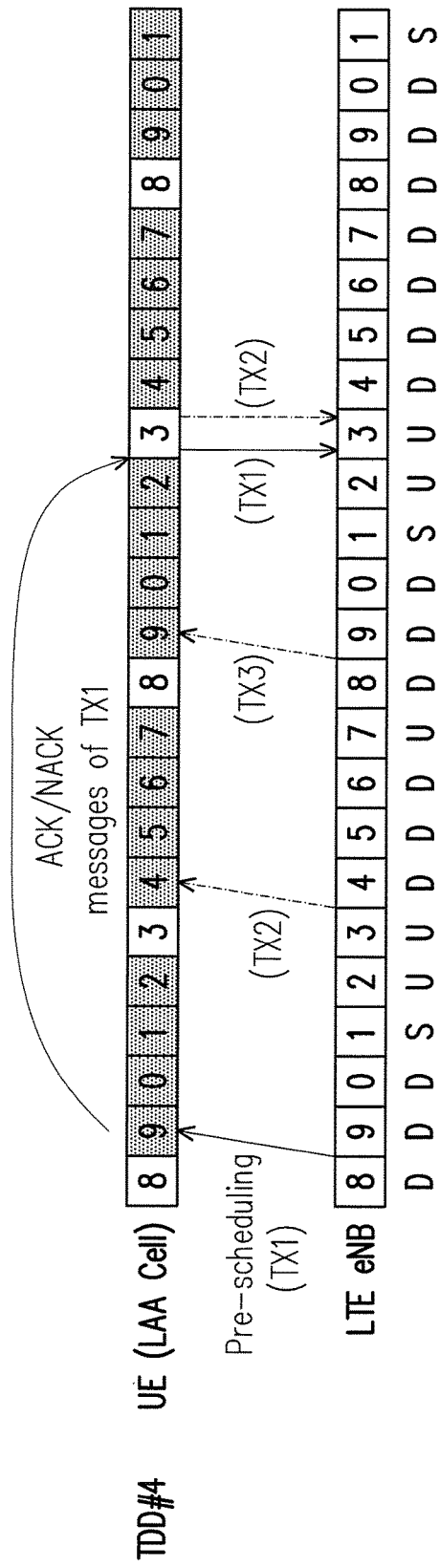
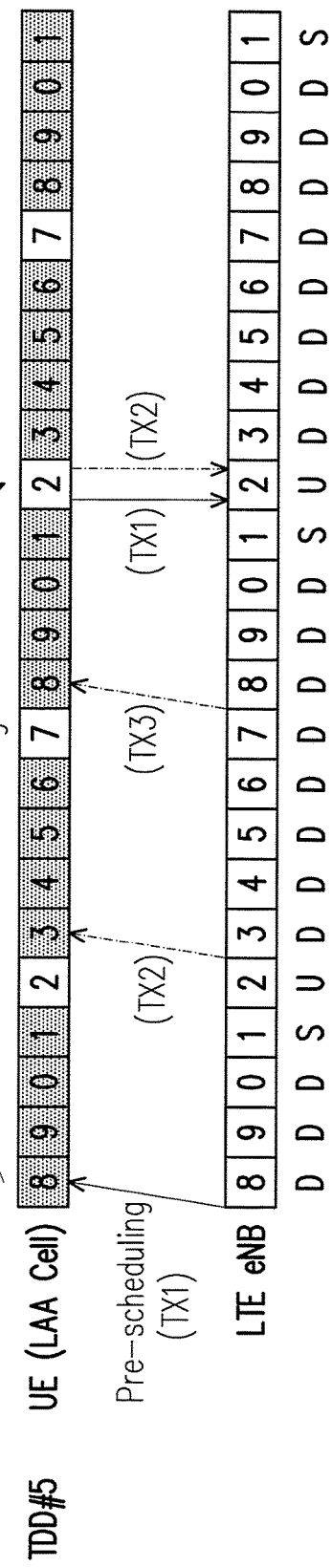
FIG. 15
FIG. 16

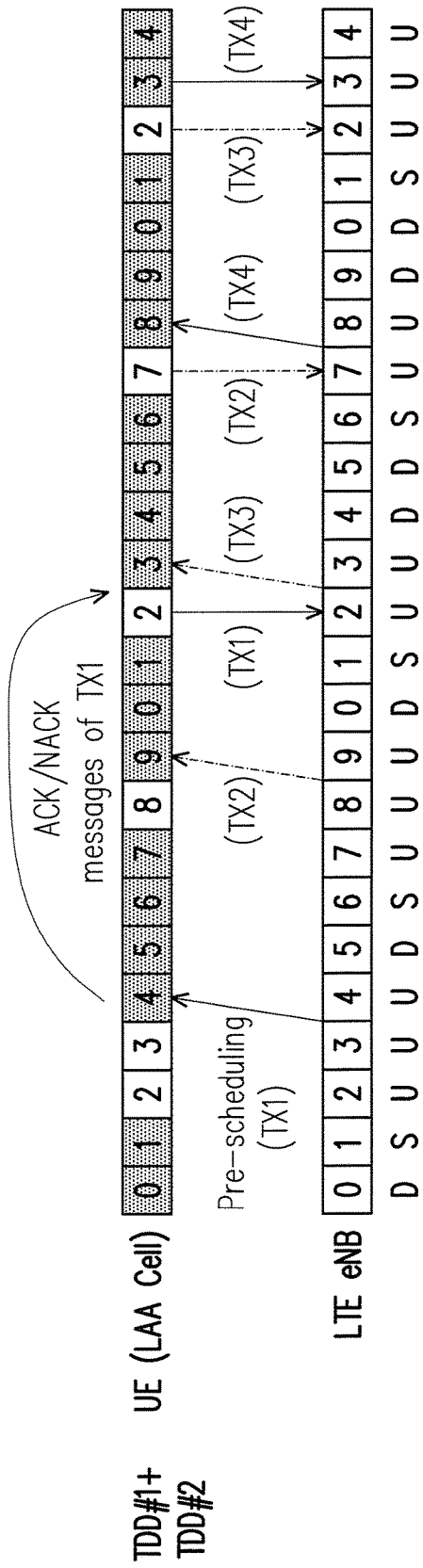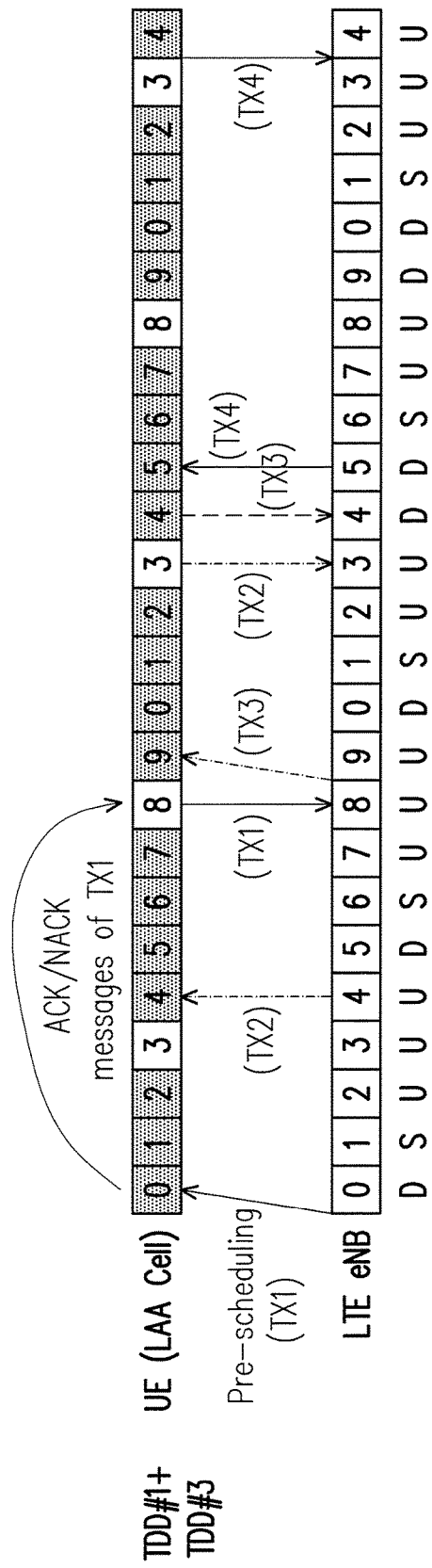
FIG. 19
FIG. 20

METHOD OF RADIO RESOURCE SCHEDULING IN UNLICENSED SPECTRUM AND RELATED APPARATUSES USING THE SAME

CROSS-REFERENCE TO RELATED APPLICATION

This application claims the priority benefits of U.S. provisional application Ser. No. 62/113,507, filed on Feb. 8, 2015 and Taiwan application serial no. 104143756, filed on Dec. 25, 2015. The entirety of each of the above-mentioned patent applications is hereby incorporated by reference herein and made a part of this specification.

TECHNICAL FIELD

The disclosure is directed to a method of radio resource scheduling in an unlicensed spectrum and related apparatuses using the same method.

BACKGROUND

Conventionally, a wireless communication system operates in a proprietary radio frequency (RF) spectrum in which base stations and wireless terminals communicate through the proprietary RF spectrum licensed to a wireless operator. However, there have discussions of wireless communication systems expanding usages to unlicensed spectrum, such as the Industrial, Scientific and Medical RF spectrum (ISM band) or other free spectrum. The possibilities of Long Term Evolution (LTE) or LTE-advanced communication systems making incursions into the unlicensed spectrums have drawn attention for telecommunication equipment vendors and operators. This has been known as 'Licensed Assisted Access (LAA)'. Currently, there has been endeavors to for attain a single global solution framework for Licensed Assisted Access (LAA) to unlicensed spectrum. One reason for such interest is the potential overcrowding of licensed spectrums. In order to provide high throughput services to more users, incursions into unlicensed spectrums might alleviate overcrowding of for wireless communication systems. However, such efforts would require solutions for numerous difficulties.

The unlicensed spectrum has been considered by cellular operators more and more as a complementary radio resource to augment their services. According to 3GPP TR 36.889 and RP-141664, LAA could be considered a secondary component (CC) carrier integrated into LTE. However, high priority should be on the completion of the DL only scenario.

Unlike LTE for which an operator would possess a specific set of operation channels, an unlicensed spectrum would need to be shared and could be shared by almost any access technologies for wireless communications. One who initiates a communication on an unlicensed spectrum may need to undergo a contention phase in order to use the frequency of unlicensed spectrum. The winner of the contention would possess the right to communicate on the frequency for a limited period at a time as defined by regional regulations such as 4 ms for each occupancy in Japan and 10 ms for each occupancy in parts of Europe. Hence, the availability of unlicensed spectrum is uncertain when one intends to communicate on the spectrum. The coverage of LAA nodes operating on unlicensed spectrum may range from 50 m to 100 m for the 5 GHz spectrum.

SUMMARY OF THE DISCLOSURE

Accordingly, the disclosure is directed to a method of radio resource scheduling in an unlicensed spectrum and related apparatuses using the same method.

In one of the exemplary embodiments, the disclosure is directed to a method of radio resource scheduling in an unlicensed spectrum applicable to a base station. The method would include not limited to: transmitting a node control information which may include an occupancy pattern of a radio resource of the unlicensed spectrum before receiving an occupancy notification; transmitting an equipment control information which comprises the occupancy pattern of the radio resource of the unlicensed spectrum before receiving the occupancy notification; transmitting a packet data by using the radio resource of the unlicensed spectrum before receiving the occupancy notification; and receiving the occupancy notification which informs an availability of the radio resource of the unlicensed spectrum.

In one of the exemplary embodiments, the disclosure is directed to a method of radio resource scheduling in an unlicensed spectrum for a licensed assisted access node (LAA node). The method would include not limited to: receiving a node control information comprising an occupancy pattern of a radio resource of the unlicensed spectrum before transmitting an occupancy notification; receiving a packet data which uses the radio resource of the unlicensed spectrum before transmitting the occupancy notification; determining an availability of the radio resource of the unlicensed spectrum; and transmitting the occupancy notification to inform the availability of the radio resource of the unlicensed spectrum.

In one of the exemplary embodiments, the disclosure is directed to a base station which includes not limited to a transmitter; a receiver; and a processor coupled to the transmitter and the receiver and is configured at least for: transmitting, via the transmitter, a node control information which comprises an occupancy pattern of a radio resource of the unlicensed spectrum before receiving an occupancy notification; transmitting, via the transmitter, an equipment control information which comprises the occupancy pattern of the radio resource of the unlicensed spectrum before receiving an occupancy notification; transmitting, via the transmitter, a packet data by using the radio resource of the unlicensed spectrum before receiving the occupancy notification; and receiving, via the receiver, the occupancy notification which informs an availability of the radio resource of the unlicensed spectrum.

In one of the exemplary embodiments, the disclosure is directed to a license assisted node which includes not limited to a transceiver and a processor coupled to the transceiver and is configured at least for: receiving, via the transceiver, a node control information which comprises an occupancy pattern of a radio resource of an unlicensed spectrum before transmitting an occupancy notification; receiving, via the transceiver, a packet data which uses a radio resource of the unlicensed spectrum before transmitting the occupancy notification; determining an availability of the radio resource of the unlicensed spectrum; and transmitting, via the transceiver, the occupancy notification to inform the availability of the radio resource of the unlicensed spectrum.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 11 illustrates the occupancy pattern of TDD configuration 0 in accordance with one of the exemplary embodiments of the disclosure.

FIG. 12 illustrates the occupancy pattern of TDD configuration 1 in accordance with one of the exemplary embodiments of the disclosure.

FIG. 15 illustrates the occupancy pattern of TDD configuration 4 in accordance with one of the exemplary embodiments of the disclosure.

FIG. 16 illustrates the occupancy pattern of TDD configuration 5 in accordance with one of the exemplary embodiments of the disclosure.

FIG. 19 illustrates the occupancy pattern of LTE eNB switching from TDD configuration 1 to configuration 2 in accordance with one of the exemplary embodiments of the disclosure.

FIG. 20 illustrates the occupancy pattern of LTE eNB switching from TDD configuration 1 to configuration 3 in accordance with one of the exemplary embodiments of the disclosure.

DETAILED DESCRIPTION OF DISCLOSED EMBODIMENTS

Figure 1A:
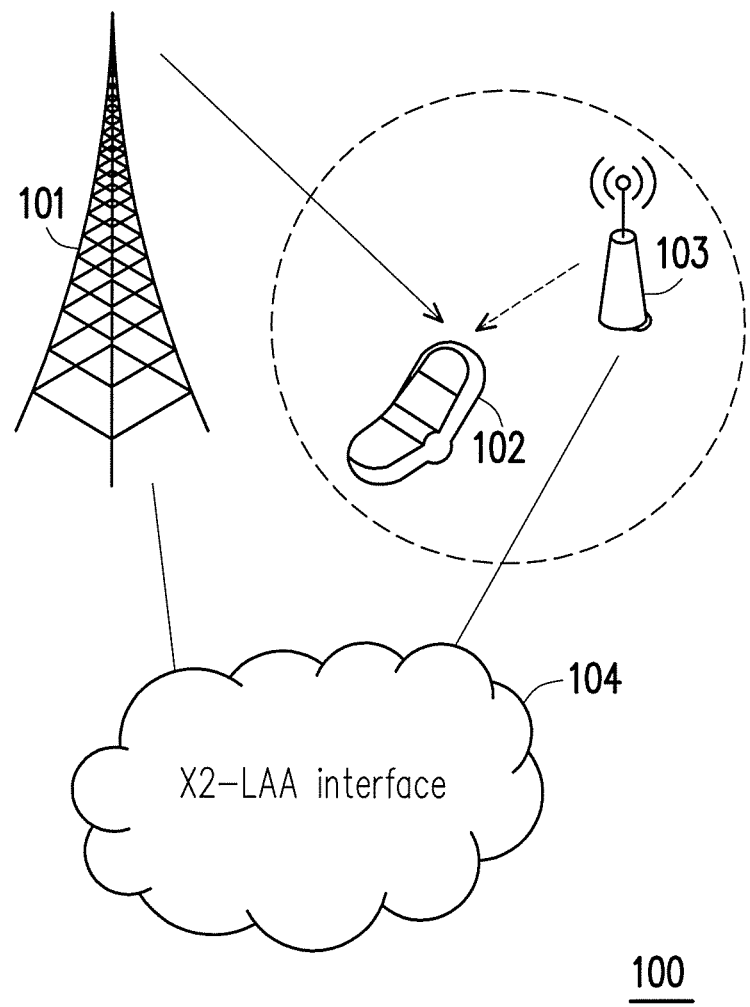
FIG. 1A is an example which illustrates an exemplary network that facilitates Licensed Assisted Access.

Reference will now be made in detail to the present exemplary embodiments of the disclosure, examples of which are illustrated in the accompanying drawings. Wherever possible, the same reference numbers are used in the drawings and the description to refer to the same or like parts.

FIG. 1A illustrates an exemplary radio access network (RAN) 100 in which a user equipment (UE) 102 supported by a LAA node 103 is situated within the coverage of a LTE eNB 101 operating on licensed spectrum. RAN would refer to the part of a mobile communication system which includes radio access nodes such as an eNB, small base stations, or Wi-Fi access points that implement at least one radio access technology such as 3G, LTE, or Wi-Fi to provide wireless radio communication services to UEs. The LTE eNB 101 could be a macro eNB. The LAA node 103 could be a small base station deployed to operate on unlicensed bands. The LAA node 103 could be centrally controlled by the LTE eNB 101.

A LAA node 103 could refer to apparatuses which may include a macro base station, a small base station, a remote radio head (RRH), a small base station, or a WiFi access point deployed to operate on an unlicensed spectrum or a licensed spectrum within the coverage of an LTE eNB 101. In this example, there could be at least one UE 102 and at least one LAA node 103 in the coverage of the eNB 101. Since the UE 102 is within the coverage of both the LTE cell of LTE eNB 101 and the LAA cell of LAA node 103 simultaneously, the UE 102 could be served by either or both of the LTE eNB 101 the LAA node 103. The eNB 101 may coordinate with the LAA node 103 to serve the UE 102.

A network interface between a LTE eNB 101 and a LAA node 103 such as the X2-LAA interface 104 as shown in FIG. 1A for example, is required for the signaling and data transmissions between an eNB 101 and a LAA node 103. The X2-LAA network interface 104 could be supported by both the eNB 101 and the LAA node 103 as the X2-LAA network interface 104 would be deployed within the coverage of both the LTE eNB 101 and the LAA node 103. Signals and data traffic of the X2-LAA interface 104 may be transmitted through a connection, which will be referred as a backhaul hereinafter, between the LTE eNB 101 and the LAA node 103.

Physically or logically, backhaul or connection between a LTE eNB 101 and a LAA node 103 could be wired or wireless. The backhaul may further be classified as either an ideal backhaul or a non-ideal backhaul as defined in 3GPP TR 36.932. Referring to 3GPP TR 36.932, an ideal backhaul would have a very high throughput and a very low latency backhaul such as dedicated point-to-point connection using optical fiber; whereas a non-ideal backhaul would refer to a typical backhaul widely used in the market such as xDSL, microwave, and other backhauls such as a relaying, which may have longer delays as well as limited capacity.

For example, the connection or backhaul between a LTE eNB 101 and a LAA node 103 may be a physical and dedicated wireline such that signals and data traffic of the X2-LAA interface 104 could be transmitted via a connection between the LTE eNB 101 and the LAA node 103. For example, it is possible that the connection or backhaul between a LTE eNB 101 and a LAA node 103 is realized by wireless communications. In other words, the signals and data traffic of the X2-LAA interface 104 may be transmitted between the LTE eNB 101 and the LAA 103 node through the transmission and/or reception of electromagnetic waves that complying with an established protocol of X2-LAA interface 104.

For example, it is possible that the connection or backhaul between a LTE eNB 101 and a LAA node 103 is a logical connection realized by several distinct physical/logical connections, the distinct physical/logical connections at least include a physical/logical connection between the LTE eNB and a core network element, and another physical/logical connection between the LAA node and a core network element. In this way, the signals and data traffic of the X2-LAA interface 104 could be transmitted between the LTE eNB 101 and the LAA node 103 through the logical connection/backhaul between the LTE eNB 101 and the LAA node 103.

For example, it is possible that the connection or backhaul between a LTE eNB 101 and a LAA node 103 is a logical connection realized by several distinct physical/logical connections, the distinct physical/logical connections is realized by at least one physical/logical connections between the LTE eNB 101 and a router, and at least one physical/logical connection between the LAA node 103 and the router. Signals and data traffic of the X2-LAA interface could be transmitted between the LTE eNB 101 and the LAA node 103 through such logical connection.

In general an ideal backhaul between a LTE eNB and a LAA node may not be assumed. A non-ideal backhaul between a LTE eNB and a LAA node would be more reasonable by considering the existing backhaul deployment of operators and should be considered for future deployment. The latency (or delay) caused by connection or backhaul between a LTE eNB and a LAA node may include not limited to signal propagation time, network transmission time, transmission latency, queuing delay in each network node or element, and the processing time needed in each network node or element of the connection.

One current difficulty associated with deploying non-ideal backhaul between LTE eNB and LAA node is that radio resource configurations and scheduling in real time would not normally be possible. The reason is that a LTE eNB may not be aware of the availability of an unlicensed spectrum immediately when an LAA node has successfully occupied the operation frequency of unlicensed spectrum. In such case, the LTE eNB would not be able to schedule data or signaling transmission for UEs upon the operation frequency occupied by the LAA node. Moreover, the utilization of the occupied frequency may exceed a threshold of 80% such that an LAA node may have difficulty occupying the operation frequency and transmitting data on it. Therefore, how to obtain and use radio resources in the unlicensed spectrum while considering backhaul latency (or delay) has yet been resolved especially when latency is longer than channel occupancy time.

Figure 1B:
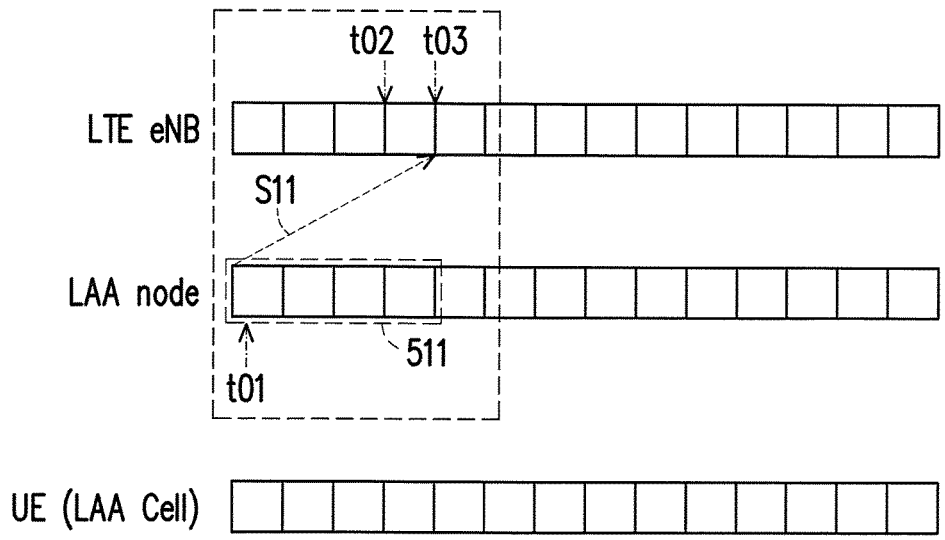
FIG. 1B is an example which illustrates a concept of a latency of a backhaul link being greater than the occupancy period as defined by a regulation.

FIG. 1B is an example which illustrates a concept of a latency of a backhaul link being greater than the occupancy period as defined by a regulation. In this example, a 5 ms backhaul latency and a 4 ms occupancy time are assumed. If a channel in an unlicensed spectrum is successfully occupied at time $t_{01}$ and assuming that in step S11 the LAA 103 has sent a notification as soon as the channel is successfully occupied at time $t_{01}$, the eNB 101 would not receive the notification until time $t_{03}$. However, at time $t_{03}$, the LAA has already released the channel of the unlicensed spectrum at time $t_{02}$ because of region regulation. Consequently, if a LTE eNB 101 schedules radio resource of LAA node 103 based on receiving the occupancy notification from the LAA node 103, the LTE eNB 101 would usually be too late to perform radio resource allocation in time due to long backhaul transmission latency of a non-ideal backhaul.

Figure 1C:
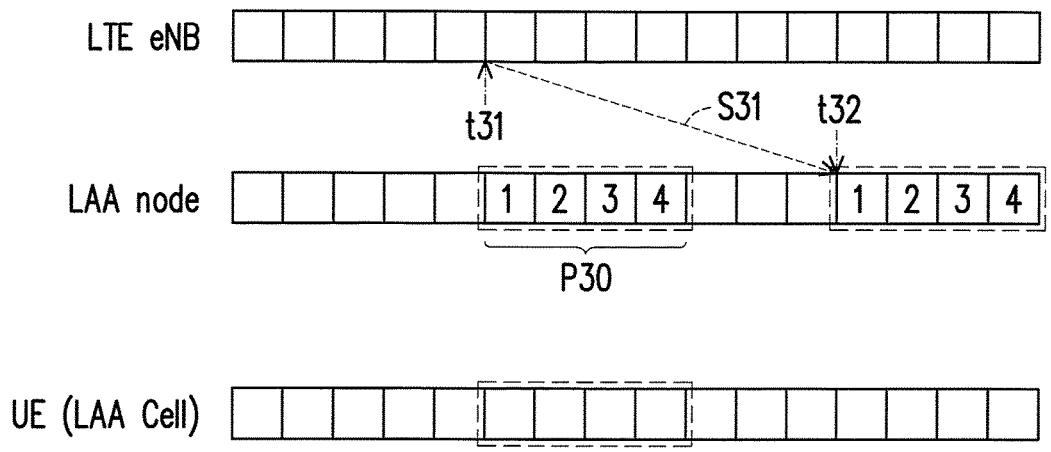
FIG. 1C is an example which illustrates the concept of a need data forwarding in view of the latency of a backhaul link being greater than the occupancy period.
Figure 3:
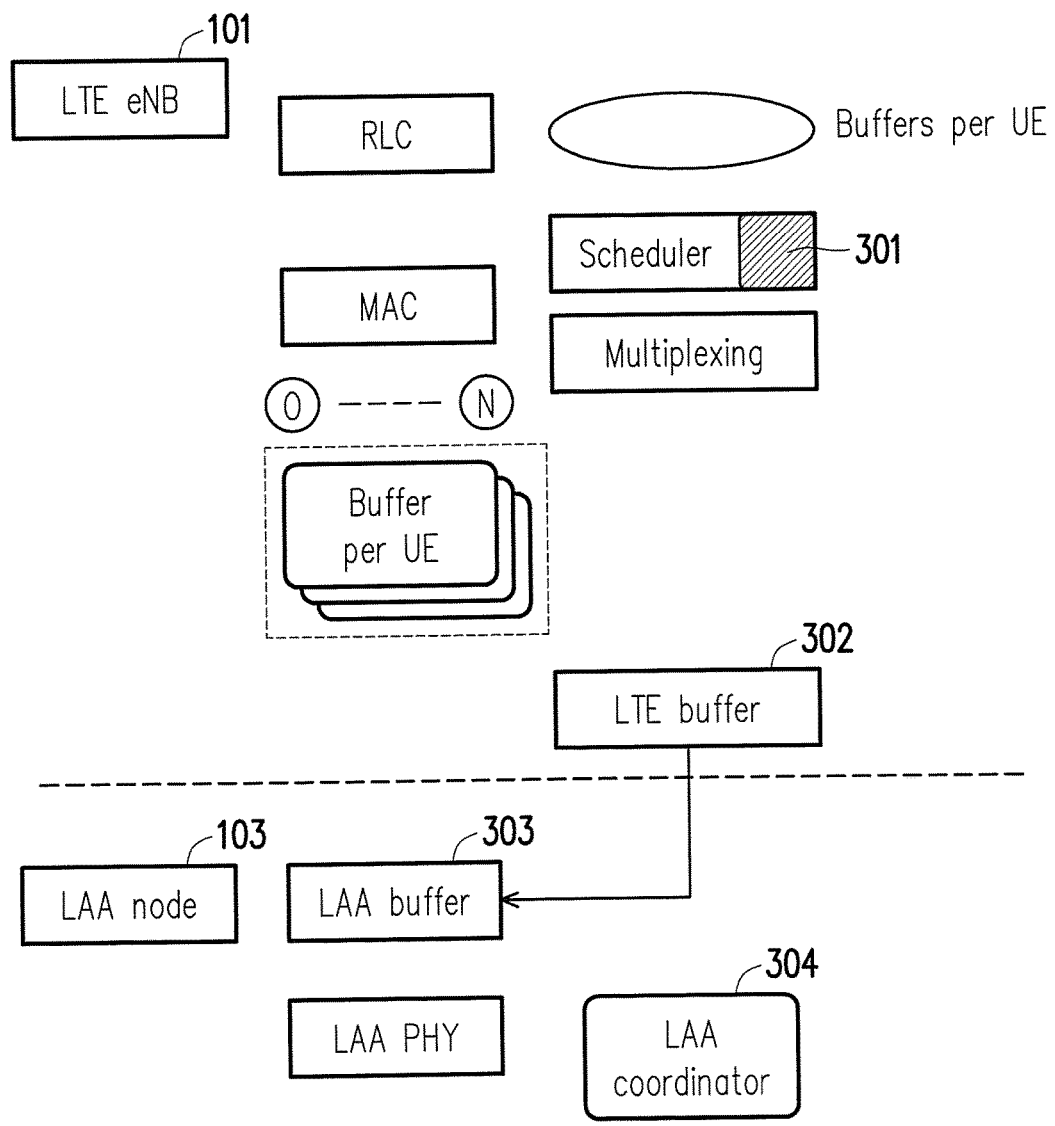
FIG. 3 illustrates a protocol stack in an LTE eNB and LAA node in accordance with one of the exemplary embodiments of the disclosure.

FIG. 1C is an example which illustrates a concept of forwarding a data in view of a latency of a backhaul link being greater than the occupancy period. In the example of FIG. 3, the LAA node could be a small base station operating on unlicensed bands. The communications between the LTE eNB and the LAA node are enabled via the X2-LAA interface. The LAA node could be centrally controlled by the LTE eNB either through a direct connection or through a cloud radio access network. A one-way transmission latency $(t_{32}-t_{31})$ between the LTE eNB and the LAA node is assumed to be 7 ms, and the authorized time of occupancy $(P_{30})$ on the unlicensed spectrum is assumed to be 4 ms. Since the occupancy time $(P_{30})$ is 4 ms, the data may need to be forwarded or transmitted from a LTE eNB to a LAA node in advance as shown in S31 when considering the transmission latency of 7 ms.

Carrier aggregation (or channel aggregation) could be utilized to enable multiple carriers or channels to be used together to provide high data transmission rates. Under carrier aggregation, a controller or coordinator of carrier aggregation would need to know the statuses of each carrier including the availability of radio frequency and the quality of radio resource instantly and immediately. In order to achieve carrier aggregation for inter-nodes communications via a non-ideal backhaul which has a latency and a limited capacity, a technique of pre-scheduling could be considered for inter-node carrier aggregation. However, since pre-scheduling may induce timing and signaling inconsistence between a LTE eNB and a LAA node, challenges involve using non-ideal backhaul for pre-scheduling LAA operations may include how LTE eNB knows whether the unlicensed spectrum is available or not, how a LTE eNB would configure a LAA node for data transmission, and such configuration would include not limited to backhaul latency and channel occupancy time, and how LTE eNB distinguishes and corrects error data (e.g. HARQ NACK from UE) caused by bad channel quality or occupancy failure. The backhaul latency could be, for example, around 5 ms for Fiber access 3, and channel occupancy time could be, for example, 4 ms in Japan, or 10 ms in Europe according to 3GPP TR 36.889. Also, a new radio resource scheduling mechanism in unlicensed spectrum could be designed in order to overcome non-real-time configuration and scheduling due to backhaul latency and in order to schedule re-transmitted data upon receiving from a UE a HARQ NACK which could be caused by bad channel quality or occupancy failure.

Since a LAA node would be responsible for operation channel occupancy and for scanning spectrum usages, a LAA node would inform LTE eNB for the success and failure of channel occupancy and for the result of scanning for spectrum usages. Furthermore, a LAA node may perform a dynamic frequency selection (DFS) and a transmit power control (TPC) so as to reduce or avoid interference in an unlicensed band. Both UEs and LAA nodes could be time aligned to a LTE eNB by performing transmission synchronization. By the way of the configuration between a LTE eNB and a LAA node, the LTE eNB could be aware of a time point that a LAA node could start signaling and data transmission if the LAA node has successfully occupied the operation frequency so that the LTE eNB can schedule LAA radio resource to UEs without real-time feedback or indication from the LAA node. LAA nodes may only need to have a PHY module which could be a module having a physical layer protocol stack and associated functions and necessary control functions. Radio resource scheduling and re-transmission would be handled by the LTE eNB; therefore, a UE may receive control signaling through PDCCH or ePDCCH from LTE eNB by cross-carrier scheduling. Control signaling may be sent from LAA node through a self-carrier scheduling. A LAA node would be controlled by a LTE eNB such as for what or which data to transmit or when to transmit.

The disclosure proposes a solution which includes coordination between LAA nodes and LTE eNB and radio resource scheduling. The proposed radio resource scheduling could be designed to maximize the utilization of occupied radio resources and to overcome the impact of non-ideal backhaul latency. The LTE eNB may schedule LAA radio resource and sends packet data to LAA node before LTE eNB receives Occupancy Notification from LAA node. The Pre-scheduling may accompany with occupancy patterns. The proposed solution of coordination and scheduling could be applied to a system architecture with either the ideal or the non-ideal backhaul.

Figure 2A:
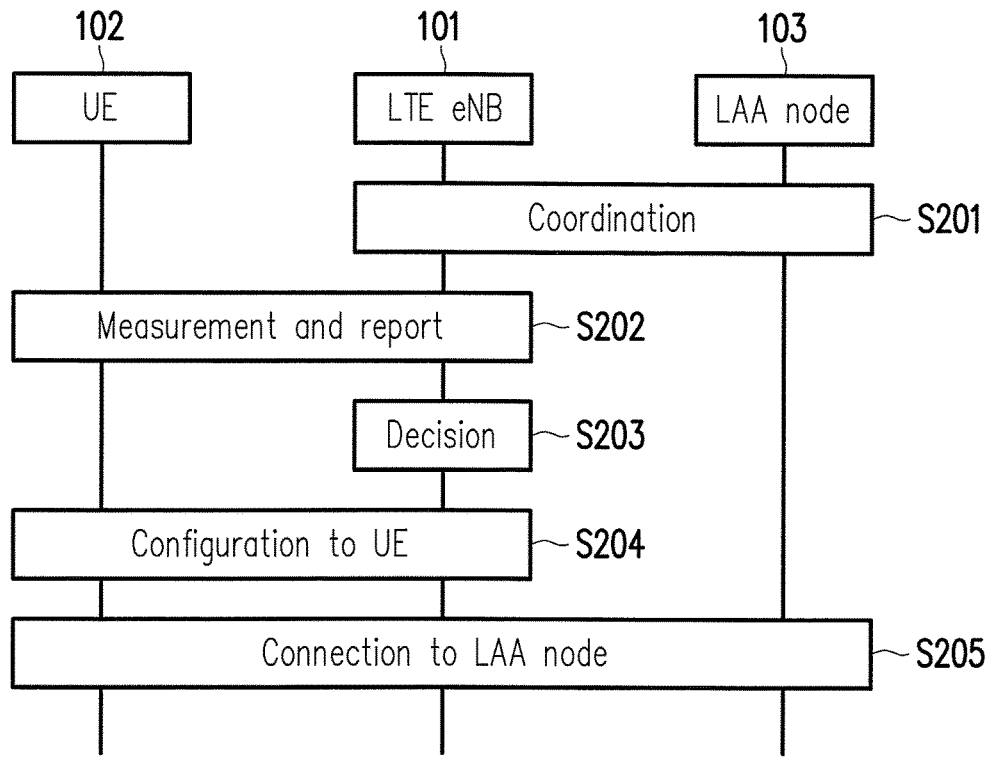
FIG. 2A is a signaling diagram which illustrates the overall process of coordination and radio resource allocation among a LTE eNB, a LAA node, and a UE in accordance with one of the exemplary embodiments of the disclosure.

FIG. 2A is a signaling diagram which illustrates the process of a LTE eNB coordinating with a LAA node in accordance with one of the exemplary embodiments of the disclosure. In order to provide services for user devices, and the LTE eNB may communicate with an UE which supports LAA in order to assist the UE to discover LAA nodes and to utilize a LAA cell of a LAA node. One LAA node may operate on multiple licensed/unlicensed bands. In each licensed/unlicensed band, a LAA node may create a logical LAA cell.

In step S201, the LTE eNB may coordinate with the LAA node by exchanging node control information. The coordination between LAA nodes and LTE eNB would include transmitting, as a part of a node control information, an occupancy pattern from LTE eNB to LAA nodes to configure LAA nodes to perform specific function on the scheduled time for channel occupancy. The occupancy pattern could be based on LTE TDD eNB uplink/downlink configurations. The coordination (i.e. the node control information) may include occupancy notification from LAA nodes to LTE eNB to inform the LTE eNB whether LAA nodes have successfully occupied radio resources and to distinguish the cause of HARQ NACK from UE such as HARQ NACK for bad signal quality or HARQ NACK for failed of channel/frequency occupancy. The coordination may include channel information being exchanged including the band frequency, the channels, channel qualities, successful rate of occupancy, and so forth. The LAA nodes and the LTE eNB may exchange information related to backhaul latency information, such as transmission delay and round trip delay, synchronization information, such as subframe ID, SFN, transmission latency, transmission power, and channel information, and an indication to start or stop performing channel occupancy in response to the network traffic.

In step S202, the UE may perform various measurements and report the result to the LTE eNB. More specifically, in step S202, the LTE eNB may transmit an instruction to the UE for performing measurements, and the instruction may include the measure bands and channels in unlicensed spectrum to be measured, cell IDs of LAA nodes, and synchronization information to assist the UE synchronize with LAA nodes. The LTE eNB may then receive the UE information which includes a measurement report, band combinations supported by the UE, UE capability for cross-carrier scheduling, and cell IDs of detected LAA nodes. Subsequently the UE may send an indication to indicate whether the unlicensed spectrum has been occupied successfully or not based on CRS (cell-specific reference signal) measurement or control information which are sent by the LAA node when it occupies the unlicensed channel successfully. UE may further inform LTE eNB the result of channel occupancy in LAA node.

In step S203, the decision step would be performed by the LTE eNB. The decision step may include assigning a UE to attach to one or multiple LAA cells of a LAA node based on the report from UE back in step S202. In step S203, the LTE eNB would transmit a configuration to the UE. The configuration to the UE may include assistance information for the UE to connect to LAA node. The assistance information may include, for example, a frequency band, a specific channel number, a LAA cell index/identification (ID), occupancy pattern used in LAA node, and the backhaul latency between the LTE eNB and LAA node. In step S205, the UE would connect to the LAA node by performing synchronization to LAA cells of a LAA node.

An X2-LAA interface (e.g. 104) may perform functions of transmitting control plane information and user plane information. Control plane information may include synchronization information, occupancy pattern, and occupancy notification. User plane information may include data format of a transport block (TB) or a subframe. A packet data may be represented in the data form of a protocol data unit, a transport block (TB) or a subframe.

Figure 2B:
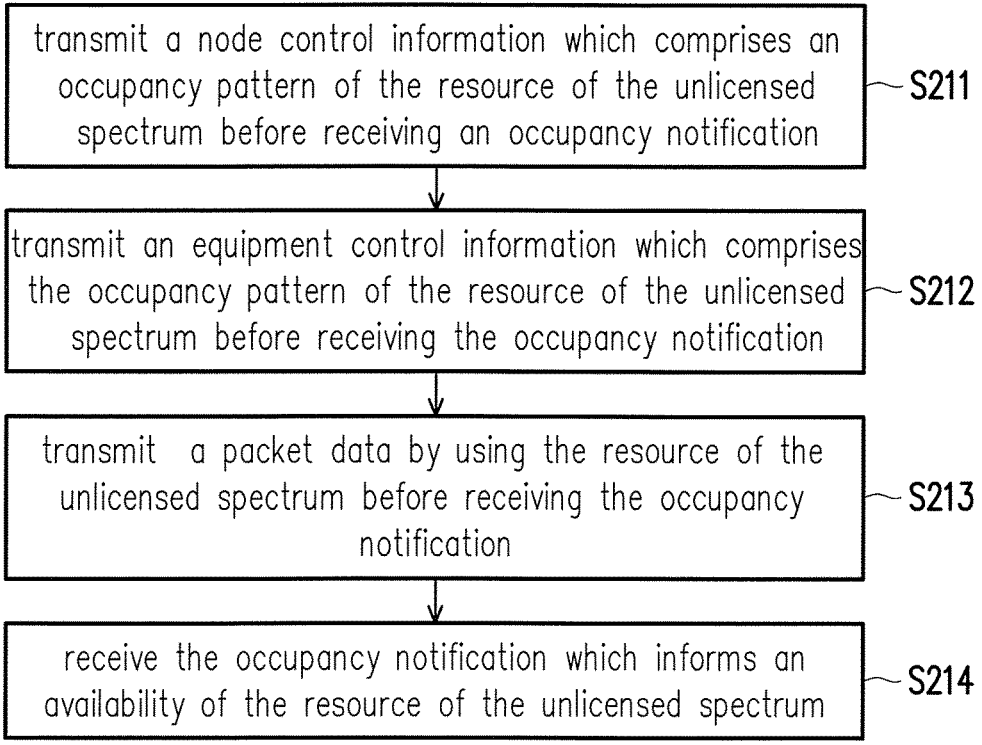
FIG. 2B illustrates the proposed method of radio resource scheduling in an unlicensed spectrum from the perspective of a base station in accordance with one of the exemplary embodiments of the disclosure.

FIG. 2B illustrates the proposed method of radio resource scheduling in an unlicensed spectrum from the perspective of a base station in accordance with one of the exemplary embodiments of the disclosure. In step S211, the base station would transmit a node control information which may include an occupancy pattern of the radio resource of the unlicensed spectrum before receiving an occupancy notification. In step S212, the base station would transmit an equipment control information which comprises the occupancy pattern of the radio resource of the unlicensed spectrum before receiving the occupancy notification. In step S213, the base station would transmit a packet data by using the radio resource of the unlicensed spectrum before receiving the occupancy notification. In step S214, the base station would receive the occupancy notification which informs an availability of the radio resource of the unlicensed spectrum.

According to one of the exemplary embodiments, the base station of FIG. 2B may further pre-schedule the packet data to be transmitted over the radio resource of the unlicensed spectrum at least by determining a starting subframe according to the occupancy pattern and transmitting the packet data to the licensed assisted access node ahead of the starting subframe according to a delay and the occupancy pattern. Transmitting the packet data to the licensed assisted access node may involve transmitting a downlink control information (DCI) destined toward a user equipment through a physical downlink control channel (PDCCH) for same subframe scheduling or cross subframe scheduling.

According to one of the exemplary embodiments, the aforementioned occupancy pattern may include a consecutive period which is restricted by a regional maximum occupancy period and a blank period which is used for a clear channel assessment or a random backoff period.

According to one of the exemplary embodiments, transmitting the equipment control information may further include transmitting a first mapping information within the equipment control information which corresponds to a first subframe of the consecutive subframes. The first mapping information may include an existence bit which indicates whether the licensed assisted access node will deliver the packet data and a reservation duration which indicates a duration of the consecutive subframes.

According to one of the exemplary embodiments, the base station may initiate a channel occupancy mechanism for the radio resource of the unlicensed spectrum by using means including transmitting a first indicator to start a channel occupancy mechanism, transmitting the occupancy pattern, and/or transmitting the packet data. The base station may stop the channel occupancy mechanism for the radio resource of the unlicensed spectrum by means including transmitting a second indicator to stop a channel occupancy mechanism, and transmitting no packet data.

According to one of the exemplary embodiments, the base station may receive an ACK signal or an NACK signal for each subframe in the consecutive period and subsequently determine a cause of failure based on the NACK signal and the occupancy notification. In response to a NACK signal being received, the cause of failure could be determined to be an occupancy failure if the occupancy notification indicates that the radio resource of the unlicensed spectrum is not available, and the packet data could be determined to be a new transmission due to the occupancy failure. In response to a NACK being received, the cause of failure could be determined to be a non-occupancy related failure if the occupancy notification indicates that the radio resource of the unlicensed spectrum is available and the packet data could be determined to be a retransmission due to the non-occupancy related failure.

According to one of the exemplary embodiments, the base station may transmit the packet data through a configured scheduling message to schedule another consecutive subframe in response to receiving the occupancy notification indicating that the radio resource of the unlicensed spectrum is available.

Figure 2C:
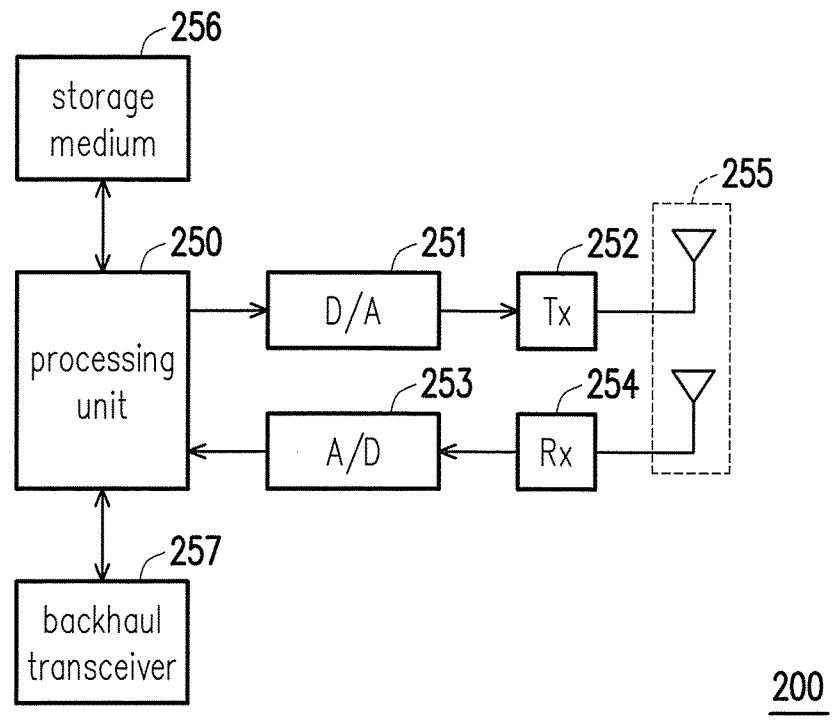
FIG. 2C illustrates an exemplary base station in accordance with one of the exemplary embodiments of the disclosure.

FIG. 2C illustrates an exemplary base station in accordance with one of the exemplary embodiments of the disclosure. A base station could may be represented by not limited to the functional elements of FIG. 2C and would include a processing unit 250, an analog-to-digital (A/D) converter 253, a digital-to-analog (D/A) converter 251, a transmitter 252, a receiver 254, a storage medium, an antenna unit 255, and optionally a backhaul receiver 257. The transmitter 252 and the receiver 254 are respectively used for transmitting and receiving radio frequency (RF) signals. The transmitter 252 and the receiver 254 could also perform operations such as low noise amplifying, impedance matching, frequency mixing, up or down frequency conversion, filtering, amplifying, and so forth. The antenna unit 255 may include one or more antennas coupled to the transmitter 252 and the receiver 254 and optionally coupled to the backhaul transceiver 257.

The processing unit 250 may include one or more processors and is configured to process digital signal and to control and implement the proposed method such as the method described in FIG. 2B as well as the subsequent disclosure that is related to the base station. The processing unit 250 may optionally be coupled to a non-transitory storage medium 256 to store programming codes, device configurations, a codebook, buffered or permanent data, and so forth. The functions of the processing unit 250 could be implemented by using programmable units such as a microprocessor, a micro-controller, a DSP chips, FPGA, etc. The functions of the processing unit 250 may also be implemented with separate electronic devices or ICs, and functions performed by the processing unit 250 may also be implemented within the domains of either hardware or software.

The backhaul transceiver 257 could be a transceiver which facilitates a wireless connection, fiber optical connection, or a cabled connection. The backhaul transceiver 257 could be used to connect to another small base station through a backhaul link such as the X2-LAA interface 104 as previously described.

Figure 2D:
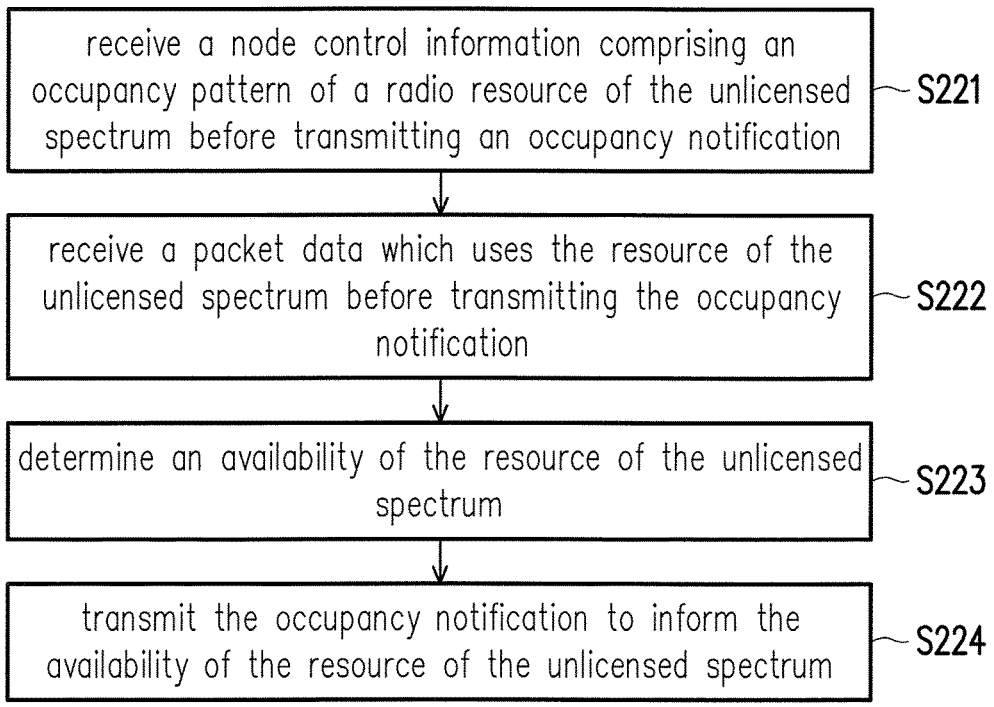
FIG. 2D illustrates the proposed method of radio resource scheduling in an unlicensed spectrum from the perspective of a licensed assisted access node in accordance with one of the exemplary embodiments of the disclosure.

FIG. 2D illustrates the proposed method of radio resource scheduling in an unlicensed spectrum from the perspective of a licensed assisted access node in accordance with one of the exemplary embodiments of the disclosure. In step S221, the licensed assisted access node would receive a node control information comprising an occupancy pattern of a radio resource of the unlicensed spectrum before transmitting an occupancy notification. In step S222, the licensed assisted access node would receive a packet data which uses the radio resource of the unlicensed spectrum before transmitting the occupancy notification. In step S223, the licensed assisted access node would determine an availability of the radio resource of the unlicensed spectrum. In step S224, the licensed assisted access node would transmit the occupancy notification to inform the availability of the radio resource of the unlicensed spectrum.

According to one of the exemplary embodiments, the licensed assisted access node may transmit the packet data if the radio resource of the unlicensed spectrum is determined to be available and discard the packet data if the radio resource of the unlicensed spectrum is determined to be not available.

According to one of the exemplary embodiments, the licensed assisted access node may receive a downlink control information (DCI) destined toward a user equipment through a physical downlink control channel (PDCCH) for either same subframe scheduling or cross subframe scheduling.

According to one of the exemplary embodiments, the occupancy pattern may include a consecutive period which is restricted by a regional maximum occupancy period and a blank period which is used for a clear channel assessment or a random backoff period. A first mapping information within the equipment control information may correspond to a first subframe of the consecutive subframes. The first mapping information may include an existence bit which indicates whether the licensed assisted access node will deliver the packet data and a reservation duration which indicates a duration of the consecutive subframes.

According to one of the exemplary embodiments, the licensed assisted access node may perform a channel occupancy mechanism for a radio resource of the unlicensed spectrum in response one or more events including receiving a first indicator to start a channel occupancy mechanism; receiving the occupancy pattern, and receiving the packet data.

According to one of the exemplary embodiments, the licensed assisted access node may stop the channel occupancy mechanism for the radio resource of the unlicensed spectrum in response to one or more events including receiving a second indicator to stop a channel occupancy mechanism and receiving no packet data.

According to one of the exemplary embodiments, the licensed assisted access node may receive the packet data through a configured scheduling signaling to schedule another consecutive subframes in response to transmitting the occupancy notification indicating that the radio resource of the unlicensed spectrum is available. The licensed assisted access node may also transmit a reservation signal to reserve the radio resource of the unlicensed spectrum in response to having occupied the radio resource of the unlicensed spectrum before setting a transmission time for the packet data.

Figure 2E:
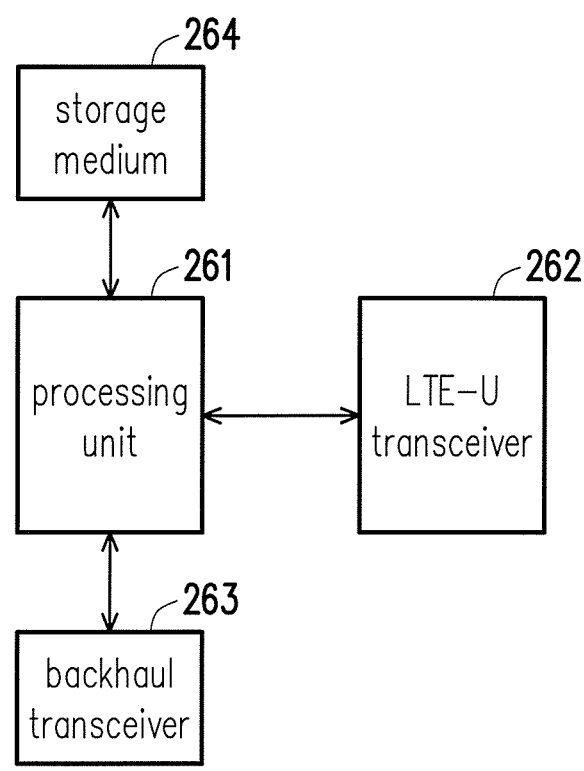
FIG. 2E illustrates an exemplary licensed assisted access node in accordance with one of the exemplary embodiments of the disclosure.

FIG. 2E illustrates an exemplary licensed assisted access node in accordance with one of the exemplary embodiments of the disclosure. The licensed assisted access node may include, but not limited to, a processing unit 261, a non-transitory storage medium 264, and one or more transceivers (e.g. 262 263). The first transceiver could be a backhaul transceiver 263 for communicating with other devices such as a base station via a backhaul link, and the second transceiver could be a LTE-U transceiver 262. The processing unit 261 would be used to control and implement the proposed method of FIG. 2D as well as the subsequent disclosure that is related to the licensed assisted access node. The LTE-U transceiver 262 could be used to communicate with UEs, hubs, or base stations over an unlicensed spectrum. The functions of the storage medium 264 and the backhaul transceiver 263 would be similar to the storage medium 256 and the backhaul transceiver 257 of the base station and thus a repetition of written descriptions would not be necessary.

FIG. 3 illustrates a protocol stack in an LTE eNB and LAA node in accordance with one of the exemplary embodiments of the disclosure. As HARQ utilizes a combination of high-rate forward error-correcting coding and ARQ error-control, and there is one HARQ entity per UE with N stop-and-wait processes (i.e., N HARQ-LAA process) for each HARQ entity. HARQ-LAA process for downlink is presented for LAA services. A transmission may be considered as a "new transmission" or a "retransmission" according to 3GPP TS 36.321. The LTE coordinator 301 may belong to higher layer functionality. For example, the LTE Coordinator 301 could be deployed in the Scheduler of media access control (MAC). The functions of the LTE Coordinator 301 may include (1) a synchronization function such as timing alignment between LTE eNB and LAA nodes, subframe boundary alignment, (2) an analysis of the cause of HARQ NACK from UE with respect to Occupancy Notification for LTE eNB to correct error data caused by bad channel quality (e.g., re-transmission) or occupancy failure (e.g., new transmission), (3) Data transmission when receiving HARQ NACK from UE for the reason of occupancy failure so as to further (3a) prevent "re-transmission" on pre-scheduled subframe if possible and (3b) to mark protocol data unit as "new transmission" when occupancy success, and (4) functions of cross-carrier and cross-subframe scheduling. After multiplexing and HARQ, LTE eNB may store Transmission Blocks (TBs) or subframe in LTE buffer 302. LTE eNB may subsequently deliver TBs or subframe to LAA buffer 303 at LAA node via X2-LAA interface through backhaul. One or two TBs are expected per subframe (e.g., downlink spatial multiplexing).

In one of the exemplary embodiments, the LTE buffer 302 may contain TBs used to assemble the content of each subframe of LAA nodes. The TBs in the LTE buffer 302 is the assembly of one or more data fragments generated by one or more HARQ processes. The LTE eNB may put the TBs and associated scheduling information to LTE PHY, such that the LTE PHY could assemble subframe content of the corresponding LAA node. The LTE PHY may send the assembled subframe content to the corresponding LAA node. The LAA node would then store the subframe content in LAA buffer 303 and transit the subframe content according to the configuration information given by the LTE node.

In one of the exemplary embodiments the LTE buffer 302 may include TBs and the scheduling information of each subframe of LAA nodes. The TBs in the LTE buffer 302 is the assembly of one or more data fragments generated by several HARQ processes. The LTE eNB may put the TBs and associated scheduling information to LTE PHY and store a duplicate in the LTE buffer 302. The LTE PHY may send the TBs and the associated scheduling information to the corresponding LAA node. The LAA node could assemble the subframe content according to the TBs and the associated scheduling information, and the LAA node could then transmit the subframe content according to the configuration information given by the LTE node.

New data (e.g., subframe content, TBs and/or scheduling information) received from the LTE eNB may override the data in the LAA buffer 303 of the LAA node. The LAA node may drop data for the corresponding LAA subframe during occupancy failure. LAA Coordinator 304 may perform functions including synchronization and subframe boundary alignment by taking the latency brought out by the connection between the LTE eNB and the LAA node into account.

Figure 4A:
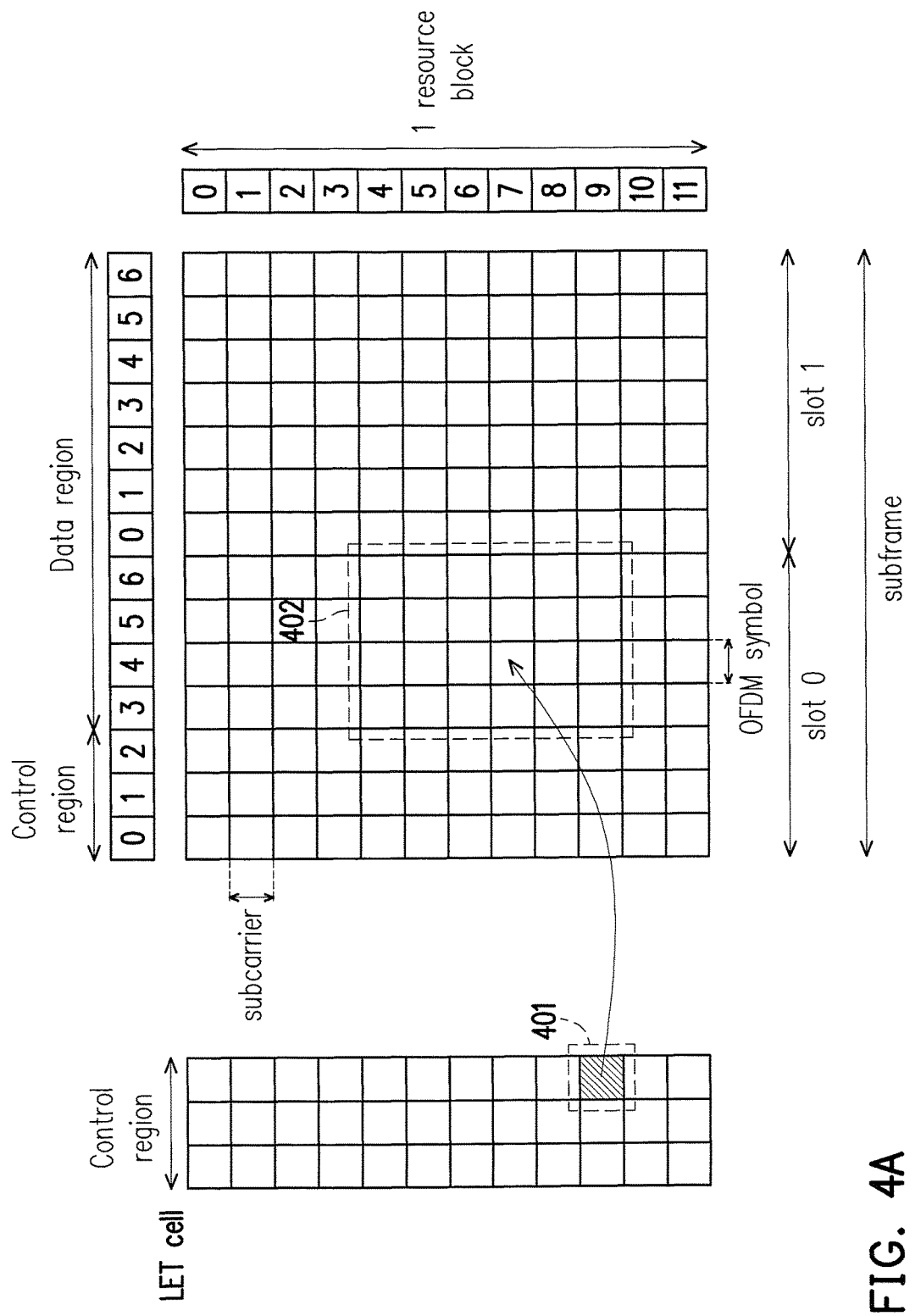
FIG. 4A illustrates an example of subframe content in LTE buffer of LTE eNB or LAA buffer of LAA node based on cross-carrier scheduling.

FIG. 4A illustrates an example of subframe content in LTE buffer 302 of LTE eNB or LAA buffer 303 of LAA node based on cross-carrier scheduling. Cross-carrier scheduling may only be used to schedule radio resources on LAA cell if PDCCH 401 in the control region used to schedule radio resources 402 of LAA cell is not included in the LAA subframe content.

Figure 4B:
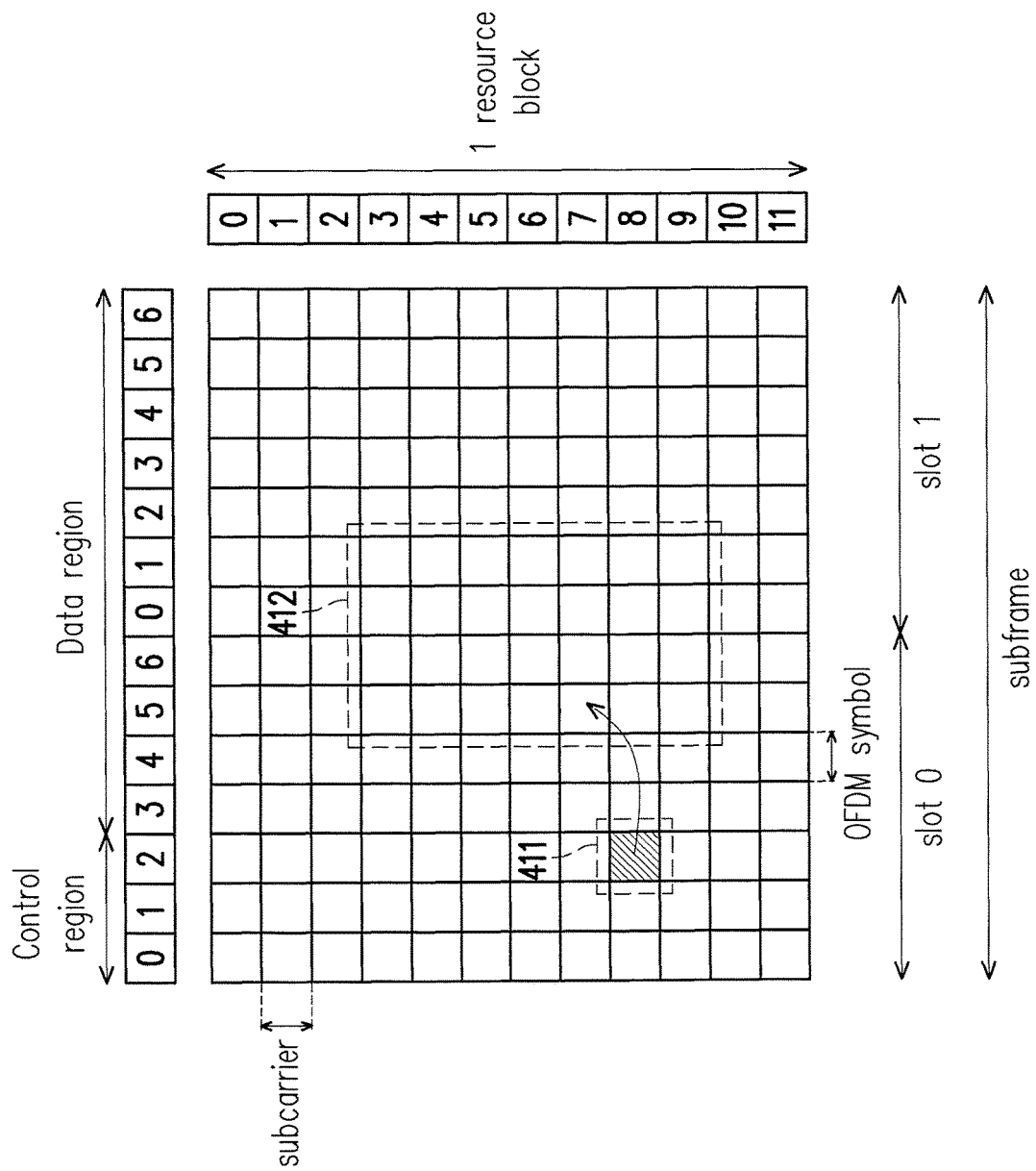
FIG. 4B illustrates an example of subframe content in LTE buffer of LTE eNB or LAA buffer of LAA node based on same-carrier scheduling.

FIG. 4B illustrates an example of subframe content in LTE buffer 302 of LTE eNB or LAA buffer 303 of LAA node based on same carrier scheduling. For same carrier scheduling, control signaling is contained in the control region of the LAA subframe content such as in PDCCH or ePDCCH 411 in order to indicate the radio resources 412 for the receiving UEs.

The concept of scheduling is proposed as follows. If a LAA node occupies an unlicensed spectrum dynamically or nomadically in the case when the backhaul latency between a LTE eNB and a LAA node is longer than the threshold of effective radio resource configuration (e.g., the threshold of real-time carrier aggregation radio resource scheduling), then the LTE eNB may not be able to schedule radio resources to a UE in the unlicensed spectrum through the LAA node in time. For improving radio resource utilization, a LAA node may perform channel occupancy mechanisms to occupy radio resource based on LTE eNB's timing. In other words, the LAA node may align with the timing of the LTE eNB timing by performing synchronization to the LTE eNB. As an example, for each successful occupancy of operation frequency the LAA node would utilize at least 1 ms radio resource of the occupied operation frequency which may correspond to 1 subframe, the LAA node may utilize at least one subframe after occupying radio resource successfully. Under such scenario, the mechanism to improve the utilization of LAA radio resource may further include (1) Pre-scheduling before the LTE eNB receives an occupancy notification from the LAA node. (2) A mechanism for per subframe or cross-subframe scheduling. Cross-subframe scheduling refers to schedule N consecutive subframes in the unlicensed spectrum such as N=4 in Japan or N=10 in parts of Europe. The scheduling by LTE eNB could be implemented by bits in the DCI (Length field), configuration index, or bitmap. (3) Occupancy pattern based on LTE eNB's configuration (i.e., Coordination between LTE eNB and LAA node) by taking LTE eNB configuration (TDD or FDD) into considerations. Blank LAA subframes could be configured for fulfilling requirements (i.e., CCA, or random backoff). Occupancy pattern and blank LAA subframes could be a part of a pre-defined period or a pre-defined pattern.

A LAA node based on occupancy pattern may perform unlicensed spectrum operation frequency occupancy mechanisms after receiving occupancy pattern from a LTE eNB, or after an indication from the LTE eNB to start performing occupancy mechanisms (e.g., which may be sent after a UE completes connection to LAA node.). The LAA node may transmit reservation signals (e.g., arbitrary signals, or specific signals) to occupy unlicensed frequencies. The LTE eNB may pre-schedule LAA radio resource after a UE completes a connection to LAA node such as in response to a UE transmitting a message to LTE eNB for completing the connection to the LAA node. Similarly, a LAA node may release occupied unlicensed frequencies if there is no data in LAA buffer for transmission. A LAA node may stop performing occupancy mechanisms after LTE eNB sends an indication to stop LAA node from performing occupancy mechanisms, or if there is no data in LAA buffer for transmission for a pre-defined time or period. For example, a LTE eNB may coordinate with a LAA node for synchronization and occupancy pattern. The LAA node may then perform occupancy mechanisms after receiving the occupancy pattern. The LAA node may transmit reservation signal to occupy unlicensed bands, or may release occupied unlicensed bands if there is no data in LAA buffer for transmission. After a UE completing a connection to the LAA node, the LTE eNB may schedule LAA radio resource and sends fragments of data that can be assembled to LAA subframe contents (e.g., subframe content, or /TBs with scheduling information) to LAA node. Based on the pre-scheduling configuration of LTE eNB, the LAA node may transmit data to UEs when its unlicensed-operation frequencies occupation is successful. The LAA node may stop performing occupancy mechanisms after receiving an indication from LTE eNB to stop using the unlicensed spectrum, or if there is no data in the LAA buffer for a pre-defined period of time.

FIG. 5A-5D serve to elucidate various aspects of the aforementioned concept of radio resource scheduling in the unlicensed spectrum. The network setup of FIG. 5A-5D is assumed to be similar to FIG. 1A. In step S501, the LTE eNB would transmit a pre-scheduling information destined toward the LAA node via a backhaul link (e.g. X2-LAA backhaul link) before the LTE eNB even receives an occupancy notification which indicates whether a radio resource of the unlicensed spectrum has been successfully occupied or not. The pre-scheduling information may include scheduling information to occupy a group of subframes 511. The one-way backhaul latency between the LTE eNB and the LAA node is assumed to be 5 ms. In response to receiving the occupancy pattern from the LTE eNB, the LAA node would attempt to occupy in the unlicensed spectrum a radio resource suitable for the occupancy pattern. In step S502, it is assumed that the LAA node has successfully occupied the radio resource in the unlicensed spectrum. In step S503, the LTE eNB node may transmit user data to the UE via scheduling information in the DCI. In step S504, the LAA node would transmit an occupancy notification to the LTE eNB to inform the LTE eNB whether the unlicensed spectrum has been occupied successfully or not.

Figure 5A:
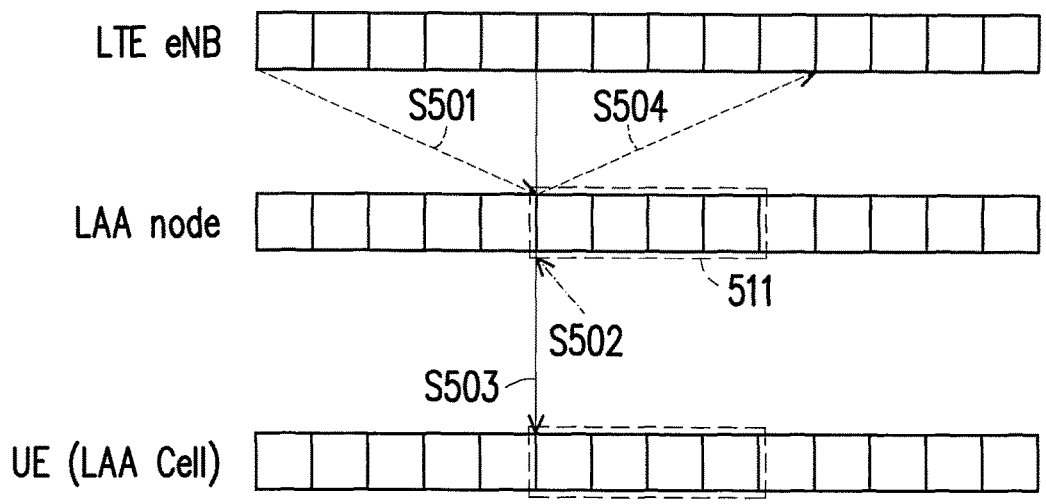
FIG. 5A illustrates the concept of prescheduling in accordance with one of the exemplary embodiments of the disclosure.
Figure 5B:
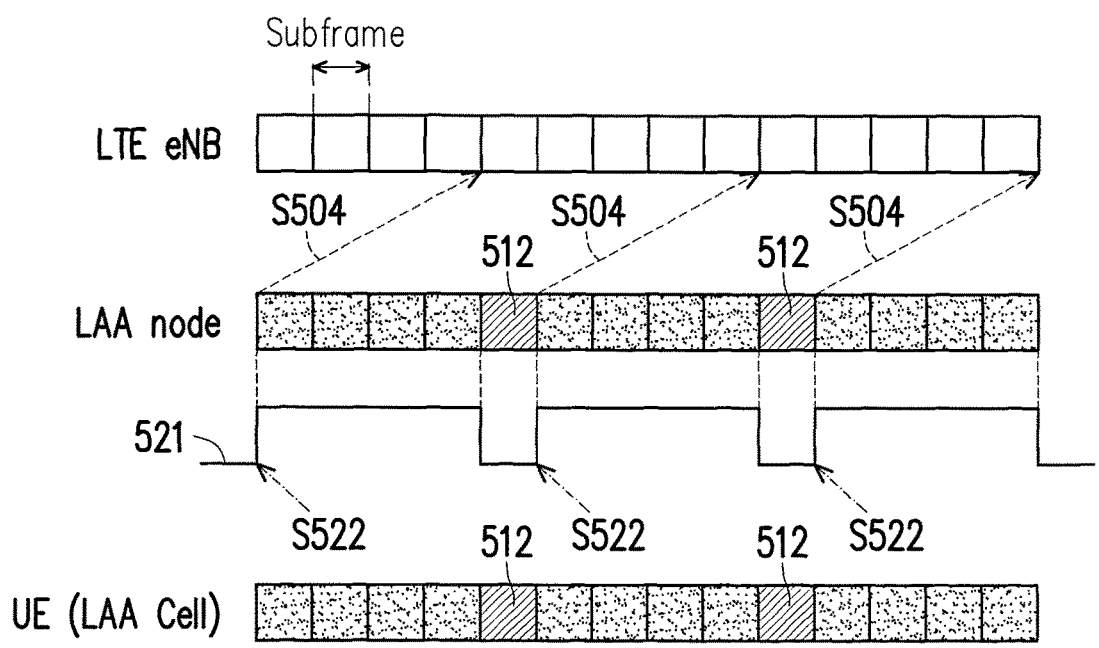
FIG. 5B illustrates an example of prescheduling under frequency domain duplex (FDD) operation in accordance with one of the exemplary embodiments of the disclosure.

FIG. 5B illustrates the occupancy pattern 521 as being 4 consecutive pre-scheduled subframes followed by a blank subframe in the unlicensed spectrum. The pre-schedule subframes (e.g. 511) may follow by a blank subframe 512 used for fulfilling requirements such as clear channel assessment (CCA) or random backoff. Assuming that in step S522, the LAA node has successfully occupied the reserved subframes, then in step S504, the LAA would transmit a occupancy notification which is the same as the embodiment of FIG. 5A.

Figure 5C:
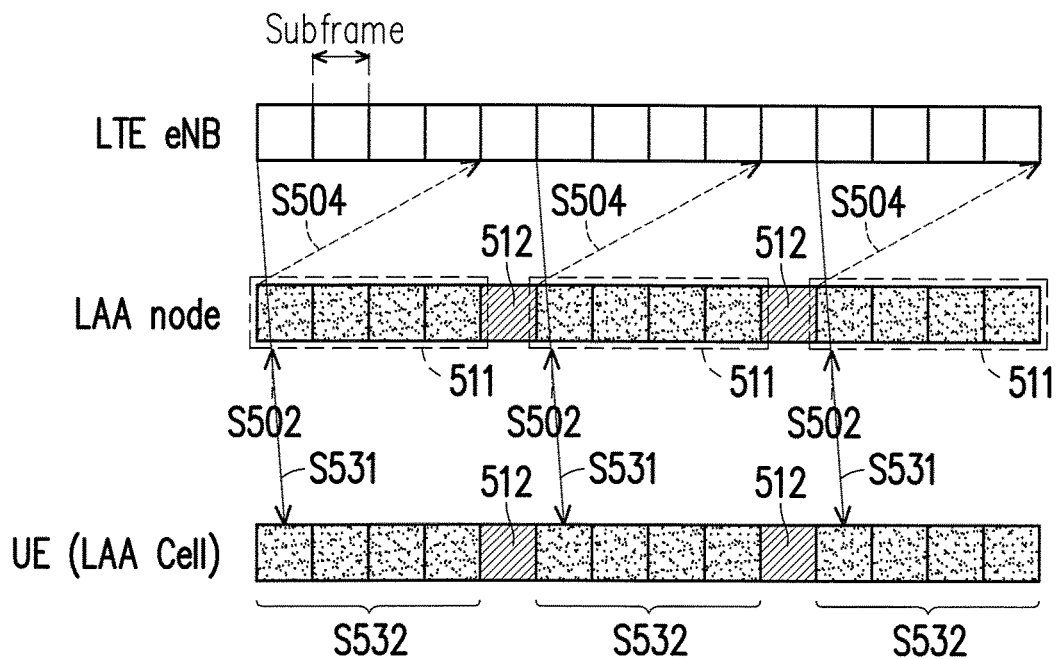
FIG. 5C is a signaling diagram which illustrates a LTE eNB transmitting data to a UE in accordance with one of the exemplary embodiments of the disclosure.

FIG. 5C further explains the embodiments of FIGS. 5A and 5B with further details. The LTE eNB is assumed to operate in FDD mode. The LAA node and UE would synchronize to the LTE eNB. The LTE eNB may configure the LAA node for occupancy time 511 such as 4 ms or 4 LAA subframes, occupancy pattern 511+512 such as every 5 ms or every 5 LAA subframes, and blank subframes 512 such as one LAA subframe after 4 LAA subframes. In addition, LTE eNB may estimate the backhaul latency between the LTE eNB and the LAA node. Therefore, LTE eNB could calculate or predict/expect the point of time the LAA node would occupy unlicensed frequencies and the occupancy time of the LAA node. The LTE eNB would also be able to estimate how long the LAA node would transmit data to UEs via the occupied unlicensed frequencies. Due to backhaul latency, it is assumed in this case that a 4 ms latency, which may corresponds to 4 LAA subframes, could be estimated between a LTE eNB and a LAA node as 4 ms could be the time required for the LAA node to send "Occupancy Notification" (i.e. time required between step S502 and step S504) to the LTE eNB or the time required for the LTE eNB to send data to the LAA node. Pre-scheduled LAA subframes may be defined as LAA subframes after LAA node sends "Occupancy Notification" as in step S504 or/and before the LAA node receives "Configured scheduling" (FIG. 6A), which may be related to occupancy time or/and occupancy pattern.

For this exemplary embodiment, 4 LAA subframes right after sending "Occupancy Notification" in step S504 are defined as pre-scheduled LAA subframes. Pre-scheduling would be performed to send data in advance from LTE eNB to LAA node for occupied radio resource/frequencies before receiving the occupancy notification. The LAA node would then transmit data to a UE when the LAA node has occupies unlicensed radio resource/frequencies/channels successfully. The LAA node may also transmit data to multiple UEs at once after LAA node occupies unlicensed radio resource/frequencies. The transmitted data for different UEs could be multiplexed through OFDMA (Orthogonal Frequency Division Multiple Access) technique. The LTE eNB which configured a LAA node may predict/calculate the point of time that the LAA node would occupy unlicensed radio resource/frequencies and starts transmitting to UEs the data that were given by the LTE eNB to the LAA node. Based on the prediction/calculation, the corresponding occupancy pattern and occupied radio resource/frequencies exchanged between the LTE eNB and the LAA node, and the pre-scheduling of LAA subframes, in step S531, the LTE eNB would send DCI through PDCCH of the LTE eNB to one or more UE that are configured and scheduled by the LTE eNB to receive DL data from the LAA node.

In step S532, The UEs would send HARQ ACK or HARQ NACK to LTE eNB to indicate the success or failure of receiving data from the LAA node. Occupancy notification from LAA node to LTE eNB may include the result of LAA node performing occupancy mechanisms by indicating whether there has been an occupancy success or an occupancy failure. Therefore, LTE eNB would be able to distinguish the cause of HARQ NACK from UEs according to whether the failure was the result of bad channel quality or occupancy failure. For example, assuming that the LTE eNB has received both a HARQ NACK from a UE, which has been scheduled to receive DL data from the LAA node, as well as an occupancy notification from the LAA node which indicated the failure of unlicensed operation frequencies occupancy. Based on these two facts, the LTE eNB could infer that the HARQ NACK from a UE was caused by the failure of LAA operation frequency occupancy rather than bad signal quality. Furthermore, the UE may send an indication along with HARQ NACK or a new message to indicate whether or not the unlicensed spectrum is occupied successfully based on CRS measurement of LAA cell if the UE is capable of performing CRS detection. The re-transmission of the data in the HARQ buffer which has not been successfully transmitted to the UE may be indicated as "re-transmission" or "new transmission" [3GPP TS 36.321].

A LAA node could be configured to occupy radio resources in the unlicensed spectrum 4 ms before a subframe boundary. If the LAA node occupies unlicensed frequencies before the LAA subframe boundary such as by being too early to transmit the scheduled or pre-scheduled data, the LAA node may transmit a reservation signal to occupy unlicensed frequencies before reaching the LAA subframe boundary. According to an exemplary embodiment, control signaling may be sent from the LAA node to the UE instead of from the LTE eNB to the UE. The LAA node may transmit data to a UE once the LAA node has occupies a radio resource in the unlicensed spectrum successfully. The LAA node may then transmit data to the UE once the LAA node occupies the radio resource in the unlicensed spectrum.

Figure 5D:
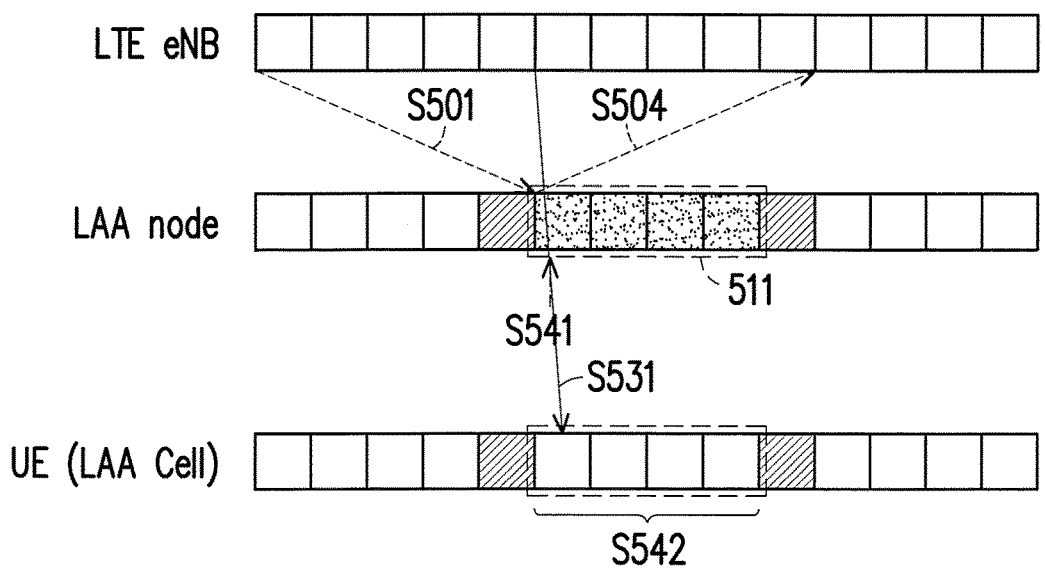
FIG. 5D illustrates the behaviors of a LTE eNB, a LAA node, and a UE in case of an occupancy failure in accordance with one of the exemplary embodiments of the disclosure.

For the scenario of FIG. 5D, step S501 is the same as previous embodiments as the LTE eNB transmits prescheduling information including occupancy pattern and pre-scheduled user data to the LAA. The occupancy pattern may include consecutive subframes 511 and a blank subframe. In step S541 however, the LAA has determined that it did not occupy a required radio resource successfully in the unlicensed spectrum and subsequently transmit an occupancy notification in step S504 to inform the LTE eNB of the occupancy failure. In response to the occupancy failure of the step S541, the LAA node would not transmit the data to the UE via the unlicensed spectrum. In step S531, in response to not receiving data correctly from the LAA node, in step S542 the UE would transmit consecutive HARQ HACKs for each of the four subframes if subframe data cannot be received correctly.

A LTE eNB would need to discern the cause of HARQ NACK from a UE such as whether the cause of HARQ NACK is the result of bad channel quality (bad data with error) or occupancy failure (meaningless data) since HARQ with Soft combining would no longer discards received bad data (with error). Bad data (due to bad channel quality) with error would be combined with next transmitted data, which may be "re-transmission" on pre-scheduled subframes.

Meaningless data (due to occupancy failure) should not be combined with next transmitted data. "New transmission" should be scheduled on pre-scheduled subframe (e.g. 511) or configured subframes (e.g. 602).

Figure 6A:
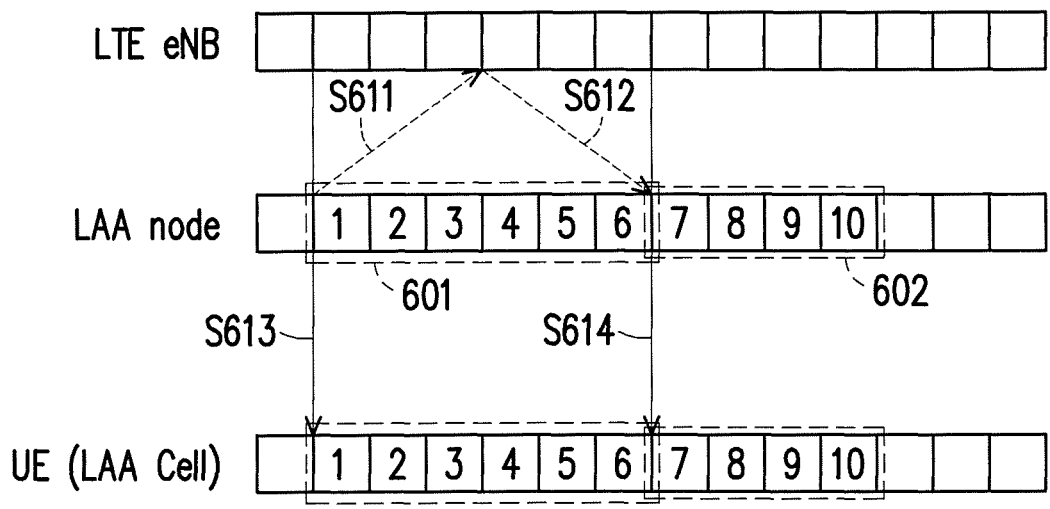
FIG. 6A illustrates radio resource scheduling in an unlicensed spectrum under FDD mode in accordance with one of the exemplary embodiments of the disclosure.

FIG. 6A~FIG. 6H serves to elucidate concepts of another exemplary embodiment. In FIG. 6A, LTE eNB is assumed to operate in FDD mode, and the LAA nodes and UEs are synchronized to LTE eNB. Also a 3 ms latency is assumed to have been be estimated between the LTE eNB and the LAA node. In step S611, the LAA node would transmit an occupancy notification to the LTE eNB. Pre-scheduling may be performed for 6 LAA subframes (601) for which the amount of pre-scheduled LAA subframe could be referred to as the round-trip delay between a LTE eNB and a LAA node. In step S613, the LTE eNB may send DCI through LTE PDCCH (e.g., per subframe or cross-subframe) to at least one UE. In response to the LTE eNB confirming that the LAA node has been successfully occupied the configured unlicensed operation frequencies and the LTE eNB can schedule the DL data to be transmitted by the LAA node via the confirmed successfully occupied unlicensed operation spectrum to specific UEs in time, the LAA in step S612 would receive packet data through a configured scheduling message from the LTE eNB. The 4 LAA subframes (602) after the LAA node receives configured scheduling from LTE eNB are defined as configured subframes. LTE eNB may schedule configured subframes through the configured scheduling message as in step S612 after LTE eNB has determined that the LAA node has occupied radio resource/frequencies successfully. In step S614, the LTE eNB would transmit to data to the UE by sending DCI through LTE PDCCH for configured subframes 604. The data corresponds to a HARQ NACK due to occupancy failure may be scheduled in configured subframes and be indicated as "new transmission". The LAA node may transmit data to a UE when it has occupied unlicensed radio resource successfully. The LAA node may also transmit data to multiple UEs once upon the LAA node occupies unlicensed radio resource/frequencies. The radio resource to multiple UEs may be multiplexed through OFDMA technique.

Since a LAA node is controlled by a LTE eNB, the LTE eNB may configure LAA node when to occupy radio resource by transmitting occupy pattern and blank LAA subframes and which data to transmit to which UEs by pre-scheduling and DCI in LTE PDCCH. Data transmission could be scheduled on pre-scheduled subframes or on configured subframes which could be pre-determined by prediction of the LTE eNB or could be configured after the LTE eNB receives the occupancy notification and sends configured scheduling. LTE eNB may utilize occupancy notification from LAA nodes to analyze the cause of HARQ NACK from UE. If HARQ NACK due to bad channel quality has been determined, a re-transmission on pre-scheduled subframes would be required. If HARQ NACK is due to occupancy failure, a new transmission on configured subframes would be required. If user data is re-transmitted on pre-scheduled subframes when a LAA node does not occupy radio resource in the unlicensed spectrum successfully, the UE may receive meaningless signal and may perform soft combining process that may combine meaningless signal with other part of data which is stored in the soft buffer.

Figure 6B:
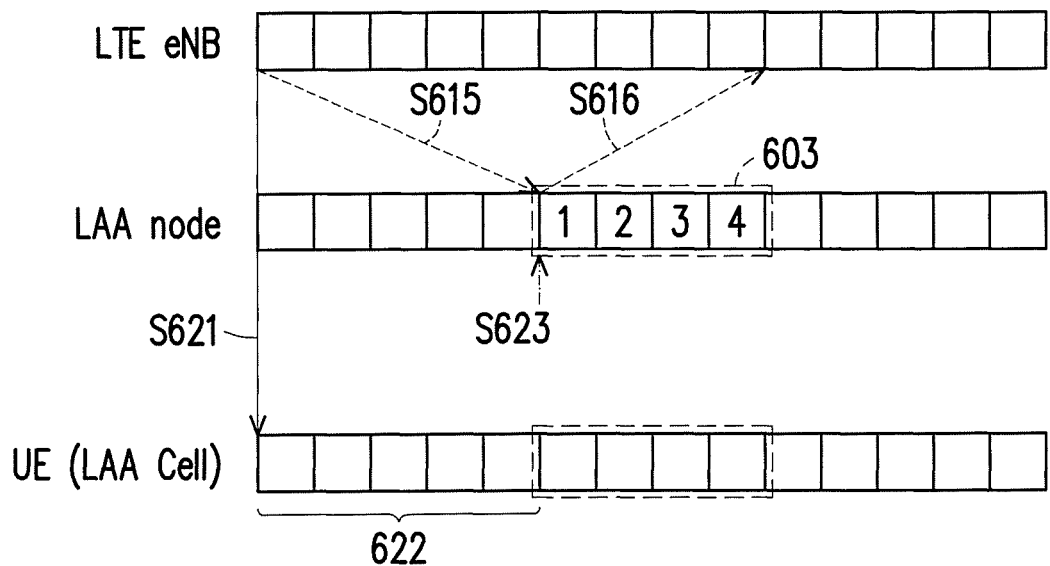
FIG. 6B illustrates radio resource scheduling in an unlicensed spectrum under FDD mode or time domain duplex (TDD) mode in accordance with one of the exemplary embodiments of the disclosure.

FIG. 6B illustrates an exemplary embodiment which is different from FIG. 6A. In this exemplary embodiment, the LTE eNB is capable of operating in FDD or TDD mode, and the LAA nodes and the UEs are synchronized to LTE eNB as subframe boundaries are aligned. The backhaul latency is 5 ms. In step S615, the LTE eNB would transmit a pre-scheduling information to configure the LAA node for occupancy pattern and occupancy time. In this example, the occupancy time is 4 ms or 4 LAA subframes. Once the occupancy success is determined in step S623, in step S616 the LAA node may send an occupancy notification to the LTE eNB. In step S621, LTE eNB may send mapping information plus DCI for pre-scheduling through LTE PDCCH to the UE before the LAA node starts data transmission or before LAA node performs occupancy mechanisms. The DCI for pre-scheduling through PDCCH may be applied after i LAA subframes, where i is a non-zero integer. In this example, i=5. Alternative, the LTE eNB may also deliver mapping information separately from step S621 such as sending mapping information through RRCConnectionReconfiguration message.

Mapping information would inform the UE which subframe to monitor or receive signaling from the LAA node. The Mapping information could be a one-to-one subframe mapping or a one-to-many subframe mapping and could be different from an occupancy pattern. Mapping information could be a data structure or a data format that allows UEs to look up the configuration for when or how to apply received PDCCH for pre-scheduling, such that a UE would be aware to receive data from LAA node. Mapping information could be UE specific as a mapping information may only apply to a unique UE. In FIG. 6B, it is shown that for the duration 622 of 5 subframes between step S621 and step S623, the UE is aware to receive data from the LAA node.

Figure 6C:
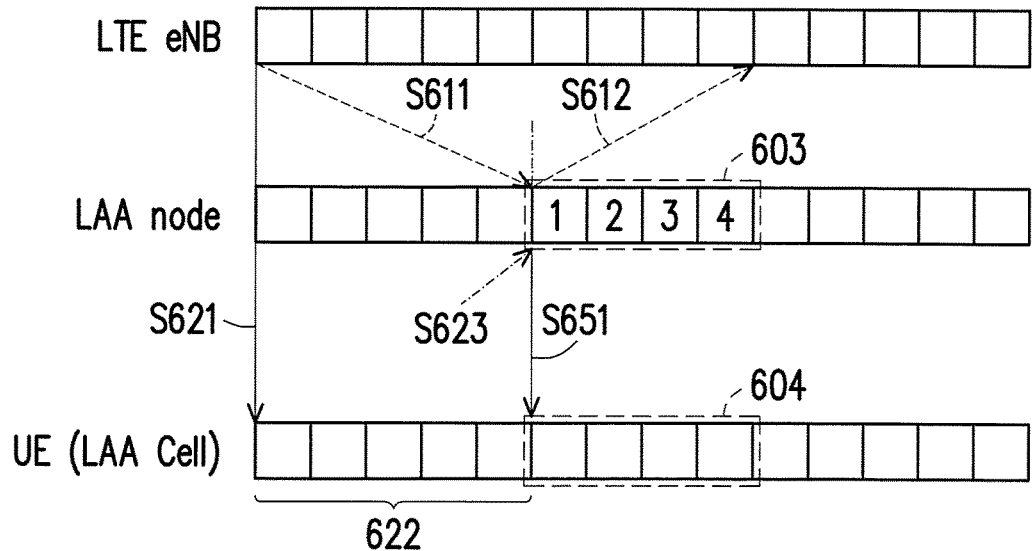
FIG. 6C illustrates eNB sending mapping information in accordance with one of the exemplary embodiments of the disclosure.

FIG. 6C illustrates an exemplary embodiment which is the same as FIG. 6B except that, for this exemplary embodiment, the LTE eNB may send mapping information in step S621 before LAA node starts data transmission, and LTE eNB in step S651 sends DCI through LTE PDCCH (e.g., per subframe or cross-subframe) to at one or more UEs, which is corresponding to the timing of a LAA node starting data transmission or prior to the LAA node performing occupancy mechanism for occupying unlicensed operation frequencies following occupancy pattern.

Figure 6D:
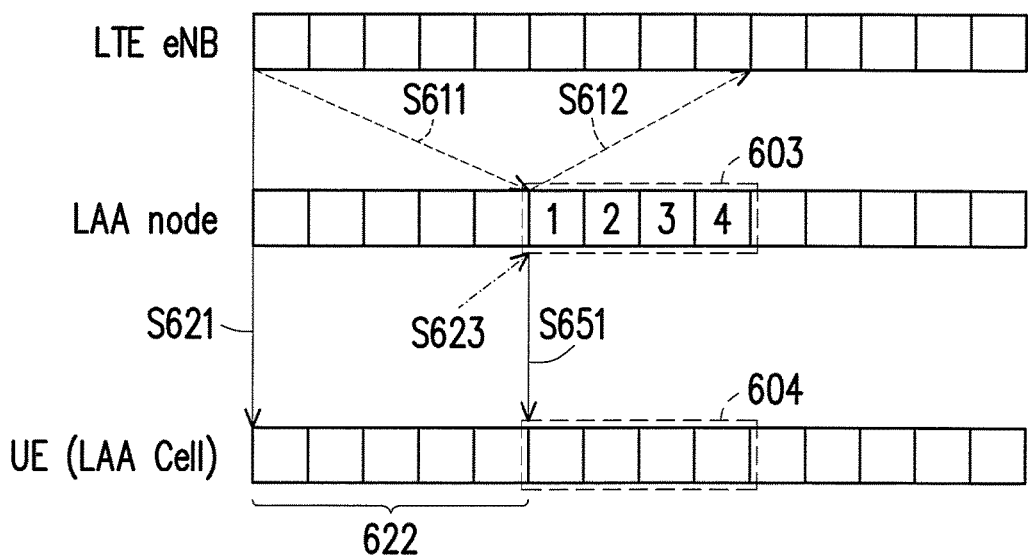
FIG. 6D illustrates occupancy mechanism in further details in accordance with one of the exemplary embodiments of the disclosure.

FIG. 6D illustrates an exemplary embodiment which is the same as FIG. 6B except that, for this exemplary embodiment, LTE eNB may send mapping information in step S621 before LAA node starts data transmission, and in step S651 the LAA node, rather than the LTE eNB, may send DCI through LTE PDCCH (e.g., per subframe or cross-subframe) to one or more UEs, which is corresponding to the timing of LAA nodes starting data transmission or prior to the LAA node performing occupancy mechanism for occupying unlicensed operation frequencies following occupancy pattern.

If LAA node operates in licensed bands, occupancy pattern and/or occupancy notification may not be required. For example, the LTE eNB may be a macro eNB. The LAA node may be a small node on licensed bands such as a simplified Pico cell eNB, which may only include a LTE PHY module operating on licensed bands while being totally controlled by the macro eNB. Instead of using the X2-LAA interface, a X2 interface could be used to enable a LTE eNB to communicate with a LAA node. However, backhaul latency may not be negligible for a X2 interface.

Figure 6E:
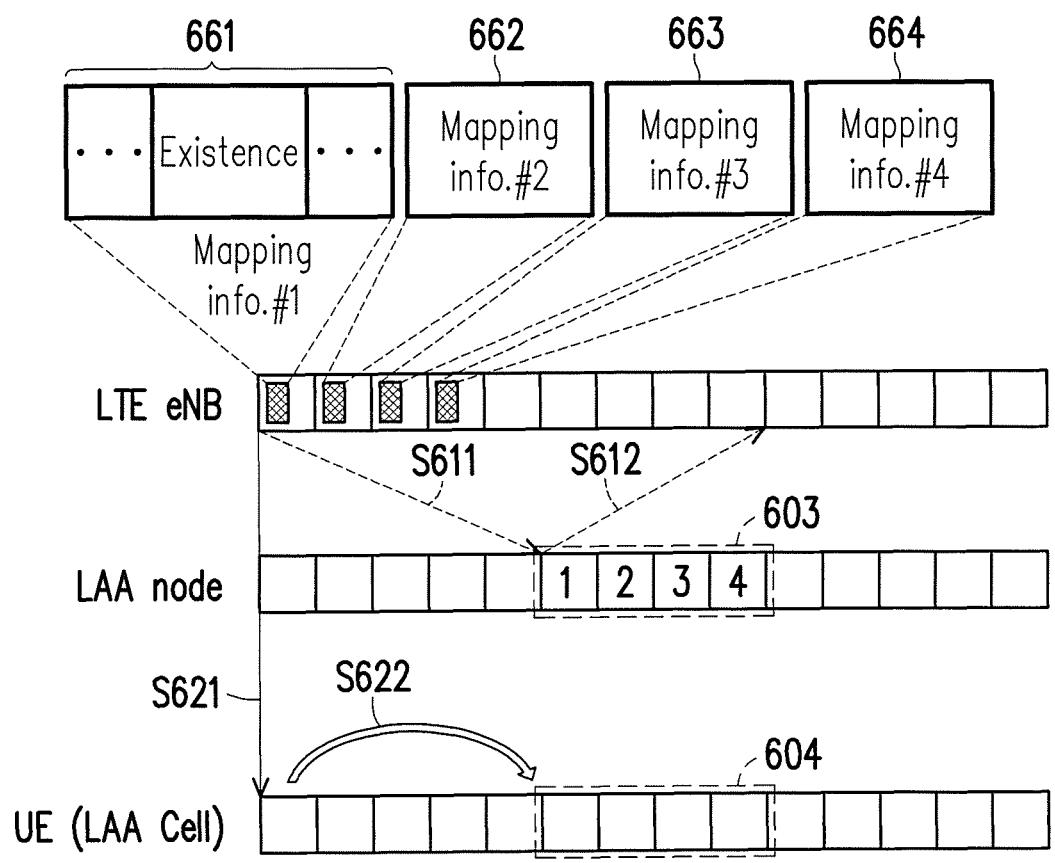
FIG. 6E illustrates eNB sending mapping information in further details in accordance with one of the exemplary embodiments of the disclosure.

FIG. 6E serves to elucidate the utilization of mapping information in further detail. In this exemplary embodiment, LTE eNB is assumed to operate in FDD mode. In step S621, the LTE eNB sends a mapping information to the UE. On a per UE basis, the mapping information may include an 'Existence bit', which may be delivered through broadcasting PDCCH or dedicated RRCConnectionReconfiguration message from the LTE eNB. The LTE eNB may set the Existence bit=1 to inform the UE whether the LAA node would deliver scheduled data to the UE after N subframes. N is not a part of the mapping information but could be calculated from a given occupancy pattern. In addition, LTE eNB may multiplex the DCI with the scheduled data to the UE. Upon receiving the 'Existence bit', in step S622, the UE would decode the DCI transmitted by the LAA node and the scheduled data. Instead when the Existence bit=0, in step S622 the UE would not monitor the unlicensed band until the next available subframe according to the given occupancy pattern.

In FIG. 6E, the LTE eNB delivers the Existence bit=1 in the Mapping information #1~4 661 662 663 664. When the UE receives the Mapping information #1 661 successfully, it would stop receiving the following Mapping information #2~4 662 663 664 for the reason of UE battery power saving. In addition, even the UE fails to decode Mapping information #1 661 successfully, the UE can still be informed of the LAA scheduling information by receiving the Mapping information #2~4 662 663 664. Thus, the duplication transmission of Mapping information #1~4 661 662 663 664 may increase the probability which the UE receives the LAA scheduled data successfully. It is worth noting that the LTE eNB would be able to provide Mapping information to multiple UEs the by providing multiple 'Existence bit' in the PDCCH or providing multiple RRC-ConnectionReconfiguration messages to many UEs.

Figure 6F:
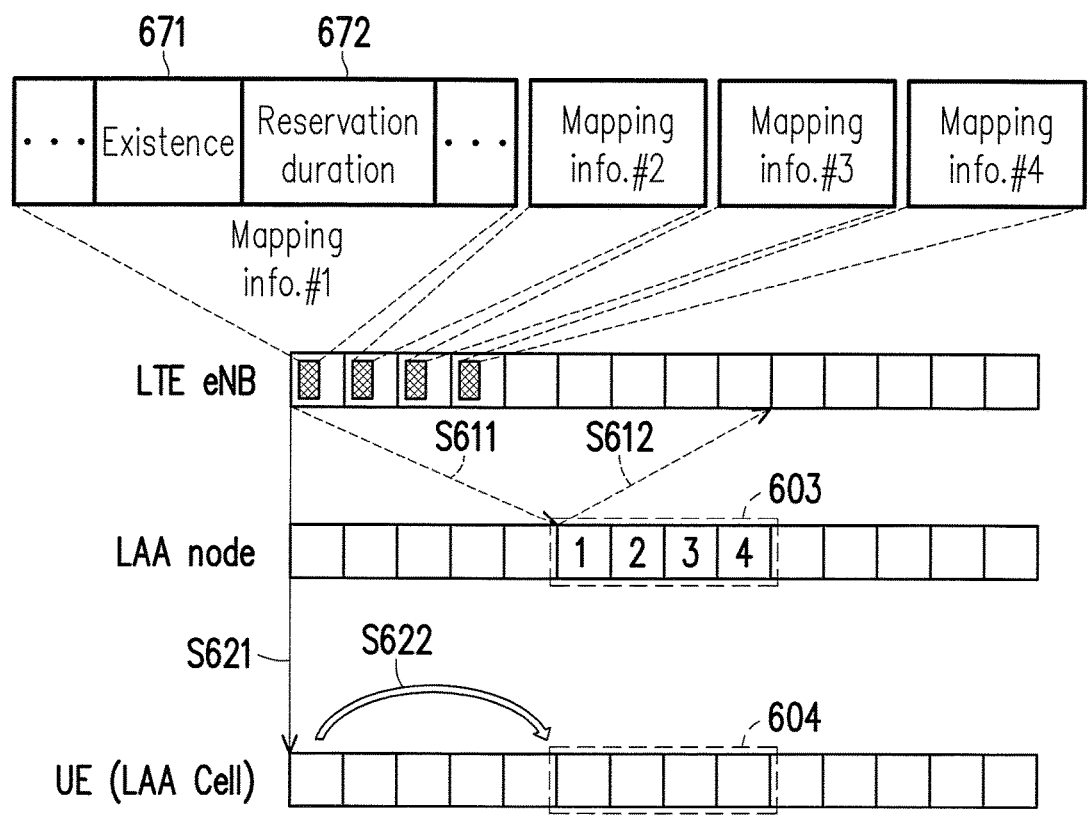
FIG. 6F illustrates contents of mapping information in accordance with one of the exemplary embodiments of the disclosure.

FIG. 6F illustrates an exemplary embodiment which is similar to FIG. 6E. For the exemplary embodiment of FIG. 6F, on a per UE basis, the Mapping information would include a set of an Existence bit 671 and a Reservation Duration 672 to the scheduled UE. By receiving the Existence bit 671, the UE is informed of whether the LAA node would deliver scheduled data to the UE after N subframes as N could be calculated from the given occupancy pattern. But instead, when the Existence bit=0, the UE would not monitor the unlicensed band until the next available subframe according to the given occupancy pattern. In addition, by receiving the Reservation duration 672, the UE would be informed of how many continuous subframes which the UE would need to receive as soon as the UE starts to receive the subframes based on the given occupancy pattern.

Figure 6G:
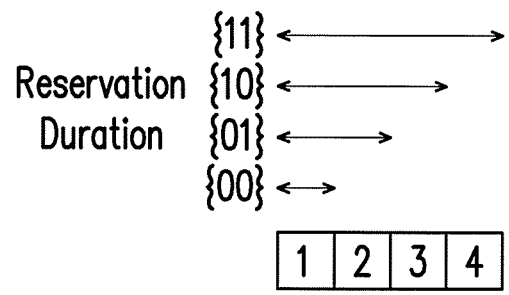
FIG. 6G illustrates a technique of delivering mapping information in accordance with one of the exemplary embodiment of the disclosure.

In FIG. 6G an example of the Reservation Duration is shown by which two bits could be used to represent the length of continuous time that a UE may needs to receive DL data from the LAA node or how many LAA subframes the UE is scheduled to receive DL data. According to FIG. 6G, when the Reservation Duration='11', it means the UE needs to receive the continuous subframe #1~#4, which starts from the next available LAA subframe as decided by the occupancy pattern. If the Reservation Duration='00', it means the UE only needs to receive the subframe #1 in the next available LAA subframe as decided by the occupancy pattern as, and the UE would not receive the subframe #2~4 for the reason of battery life saving.

For the exemplary embodiment of FIG. 6F, LTE eNB may deliver the Existence bit 671 and Reservation Duration 672 to the UE through broadcasting PDCCH or dedicated RRC-ConnectionReconfiguration message. Moreover, LTE eNB would send the PDCCH with the scheduled data to UEs so that after receiving the Existence bit 671, the UE may need to decode the PDCCH transmitted by LAA node to decode the scheduled data. In FIG. 6F, the LTE eNB would deliver the same Existence bit 671 Reservation Duration 672 in the Mapping information #1~4. For a UE which receives the Mapping information #1 successfully, the UE would not need to receive the following Mapping information #2~4 for the reason of UE battery power saving. If the UE fails to decode Mapping information #1, the UE would then be informed of the LAA scheduling information by receiving one of the Mapping information #2~4.

Similarly, the LTE eNB may deliver the Existence bit 671 Reservation Duration 672 to multiple UEs through broadcasting PDCCH or dedicated RRCConnectionReconfiguration message. Moreover, the LTE eNB would multiplex the PDCCH with the scheduled data to UEs within the scheduled data. So, after receiving the 'Existence bit' 671, UEs need to decode the PDCCH transmitted by LAA node to decode the scheduled data. In FIG. 6F, the LTE eNB may also deliver the same Existence bit 672 Reservation Duration 672 in the Mapping information #1~4. To one UE which receives the Mapping information #1 successfully, it would not receiving the following Mapping information #2~4 for the reason of UE battery power saving. If the UE fails to decode Mapping information #1, the UE can then be informed the LAA scheduling information by receiving of the Mapping information #2~4.

Figure 6H:
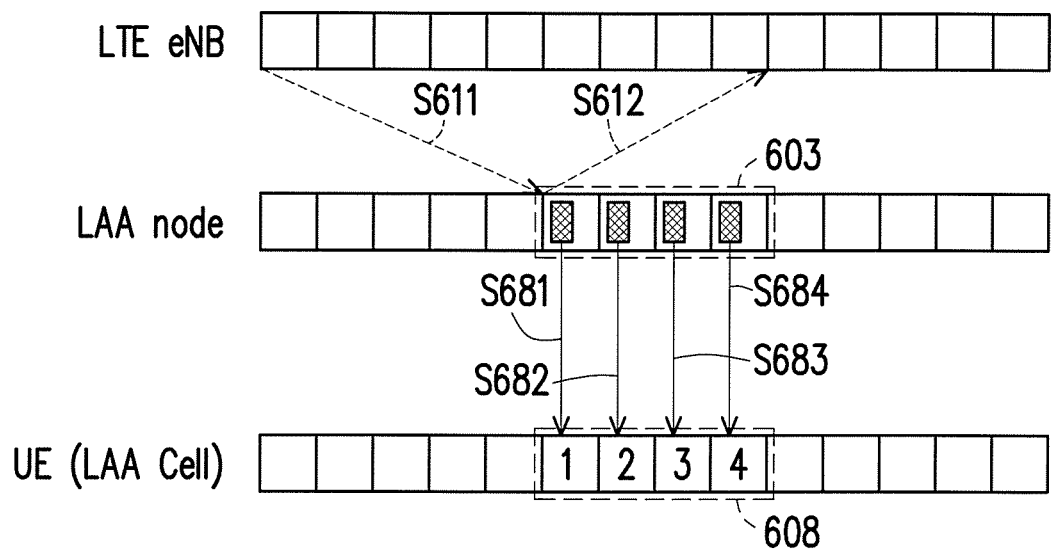
FIG. 6H illustrates a LAA node delivering mapping information to UE in accordance with one of the exemplary embodiments of the disclosure.

For the exemplary embodiment of FIG. 6H, the LTE eNB is assumed to operate in FDD mode. In step S611, the LTE eNB may deliver the configuration, such as the occupancy pattern, to UE and LAA node. The LAA node and UE would know when the LAA node would try to access the unlicensed operation frequencies. After the LTE eNB delivers the Mapping information in the PDCCH which is sent with the scheduled data to LAA node, the LAA node subsequently would deliver PDCCH with Mapping information and scheduled data to UEs. As shown in FIG. 6H, in step S681, the LAA node would deliver the scheduled data corresponding to mapping information #1 to subframe 1 of the UE. In step S682, the LAA node would deliver the scheduled data corresponding to mapping information #2 to subframe 2 of the UE. In step S683, the LAA node would deliver the scheduled data corresponding to mapping information #3 to subframe 3 of the UE. In step S684, the LAA node would deliver the scheduled data corresponding to mapping information #4 to subframe 4 of the UE. By receiving the Mapping information #1 Existence bit, Reservation Duration, UE would start to receive M continuous subframes which M is decided by the Reservation Duration as shown in FIG. 6G. For a UE, the scheduled data would be given only in part of the subframe #1~4 when the Existence bit and Reservation Duration is set as 1 and 01 respectively. In this condition, the UE would only receive the subframe #1~2 based on the given occupancy pattern. It is worth noting that even if the UE may fail to decode PDCCH #1, the UE could then be informed the scheduling information and Mapping information by receiving one of the following PDCCH #2~4. The duplicated transmission of PDCCH #1~4 may increase the probability which the UE receives the LAA scheduling information successfully.

In a similar embodiment to the exemplary embodiment of FIG. 6H, the LTE eNB is assumed to operate in the FDD mode. LTE eNB may deliver the configuration, such as the occupancy pattern, to UE and LAA node. The LAA node and UE would then know when the LAA node would try to access the unlicensed operation frequencies. In FIG. 6H, the LTE eNB would deliver the Mapping information by providing (Existence bit, Reservation Duration) in the PDCCH, which is multiplexed with the scheduled data to LAA node. Thus, the LAA node would deliver PDCCH with Mapping information and scheduled data to UEs. By receiving the (Existence bit, Reservation Duration) in Mapping information #1, the UE would start to receive M continuous subframes which M is decided by the Reservation Duration as shown in FIG. 6G. For a UE, the scheduled data would be multiplexed only in part of the subframe #1~4, i.e. the (Existence bit, Reservation Duration) is set as (1, 01). In this condition, the UE would only receive the subframe #1~2 based on the given occupancy pattern. It is worth noting that even if the UE may fail to decode PDCCH #1, the UE could then be informed the scheduling information and Mapping information by receiving one of the following PDCCH #2~4. The duplication transmission of PDCCH #1~4 may increase the probability which the UE receives the LAA scheduling information successfully.

Figure 7:
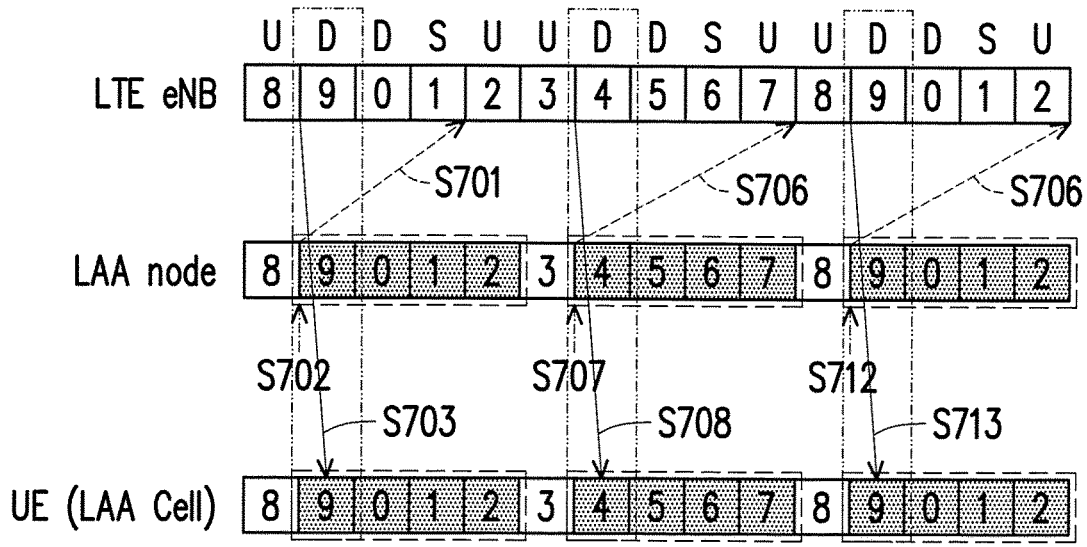
FIG. 7 illustrates a radio resource scheduling mechanism in an unlicensed spectrum under TDD mode in accordance with one of the exemplary embodiments of the disclosure.
Figure 8:
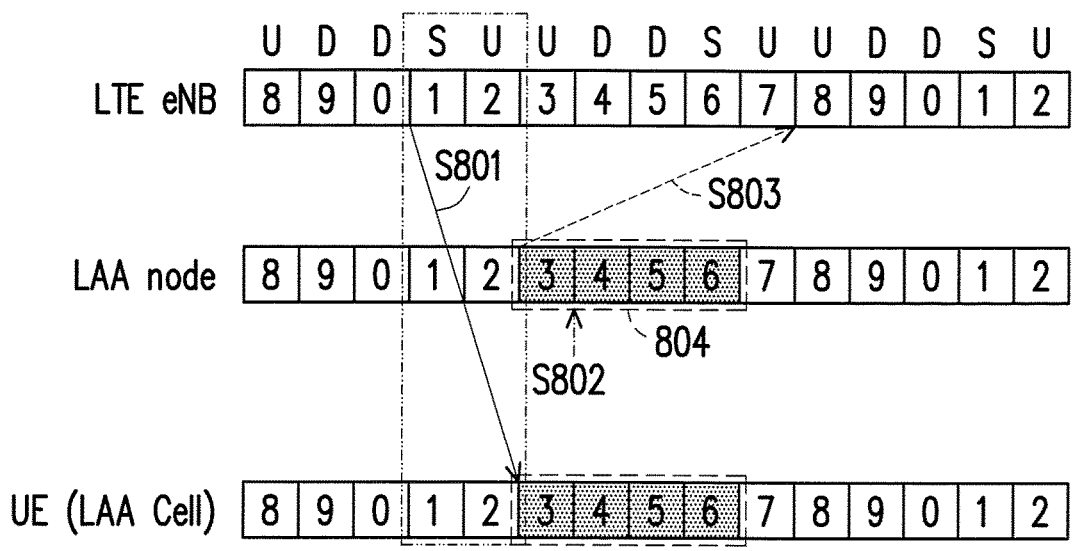
FIG. 8 illustrates another exemplary embodiment of a radio resource scheduling mechanism in an unlicensed spectrum under TDD mode.

As for the scheduling process in TDD mode, LTE PDCCH could be transmitted from a LTE eNB to a UE in Downlink (D) or Special (S) subframe. FIG. 7 illustrates an exemplary embodiment of the LTE eNB selecting a subframe configured as D or S based on the LAA node occupancy pattern or backhaul latency between LTE eNB and LAA node to send the pre-scheduling information for UEs to receive DL data from a LAA node. FIG. 8 illustrates an exemplary embodiment in which if the LTE eNB selects a subframe configured as U (uplink) to send the pre-scheduling information for UEs to receive DL data from a LAA node based on the LAA node occupancy pattern or backhaul latency between LTE eNB and LAA node, the LTE eNB may re-select a subframe configured as D or S in prior of the selected subframe to send the pre-scheduling information (e.g., DCI in PDCCH) to UE. Each of the two figures are explained in further detail.

FIG. 7 illustrates an embodiment of a LTE eNB operating in TDD mode. The LAA node and the UE are assumed to have synchronized to the LTE eNB. In step S701, the LAA node transmit an occupancy notice after determining occupancy success in step S702. In step S703, the LTE eNB may configure LAA node for occupancy time (e.g., 4 ms or 4 LAA subframes), occupancy pattern (e.g., every 5 ms or every 5 LAA subframes), and blank LAA subframes (e.g., one LAA subframe after 4 LAA subframes). As an example, 4 ms latency may be estimated as shown in FIG. 7. Occupancy pattern may be configured according to the uplink/downlink configuration of LTE cell of LTE eNB [3GPP TS 36.300]. In this exemplary embodiment, LTE Subframes #9/0/1/2 and Subframes #4/5/6/7 may align with the time that the LAA node is configured to occupy unlicensed radio resource and to transmit data. LTE Subframe #3 and LTe Subframe #8 may align with the time that the LAA subframes are configured as blank subframes. LTE eNB may send DCI through LTE PDCCH (e.g., LTE PDCCH per subframe) to at least one UE every special (S) or/and downlink (D) subframes. LTE eNB may send DCI through LTE PDCCH (e.g., cross-subframe) to at least one UE in the first LTE subframe aligned with the time of the first LAA subframe if the LAA node successfully occupied the unlicensed operation frequencies (i.e., Subframe #4 and Subframe #9).

FIG. 8 is an embodiment. LTE eNB operates in TDD mode. The LAA node and UE are assumed to have synchronized to LTE eNB. In this embodiment, only one occupancy time of 4 ms is shown. As an example, 4 ms latency may be estimated in FIG. 8. In step S801, the LTE eNB sends DCI for prescheduling to the LAA node and to the UE for transmitting data on a group of subframes 804. In response to determining occupancy success in step S802, the LAA node transmits occupancy notification to the LTE eNB in step S803. When the first LAA subframe is timing aligned with a uplink subframe of LTE cell of LTE eNB, the LTE eNB scheduled DCI to at least one UE for the first LAA subframe or for consecutive LAA subframes or cross-subframe is given in previous downlink (D) or special (S) subframe which is Subframe #1 in this exemplary embodiment.

Figure 9:
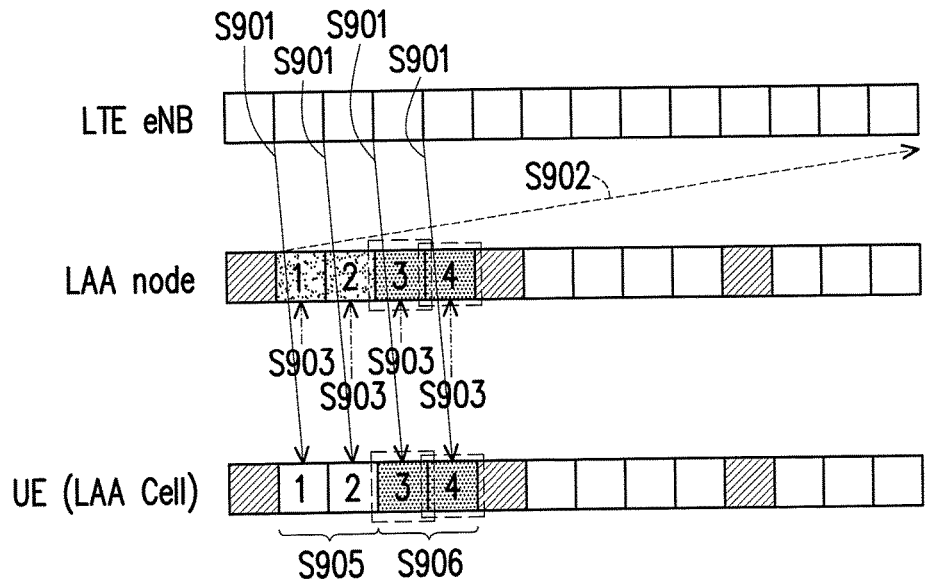
FIG. 9 illustrates a radio resource scheduling mechanism on a per subframe basis in accordance with one of the exemplary embodiments of the disclosure.

FIG. 9 illustrates applying Mapping information in TDD mode. In this exemplary embodiment, it is assumed that the LAA node and the UE are synchronized to the LTE eNB. In step S901, LTE eNB may send DCI through LTE PDCCH (e.g., cross-subframe) to one or more UEs, and an occupancy notification can be sent from the LAA node to the eNB in step S902. If the LAA node has successfully occupied the unlicensed operation frequencies in the pre-configured time to perform occupancy mechanism (i.e., the starting time of LAA Subframe #1), then the LAA node would be able to utilize the consecutive LAA subframes (i.e., LAA Subframe #1~LAA Subframe #4) for the configured occupancy time (e.g., 4 ms or 4 LAA subframes as shown in FIG. 9). If the LAA node has failed the occupancy of the $n^{th}$ LAA subframe, the LAA node may perform occupancy mechanisms at the starting time of LAA Subframe #(n+1) and utilized LAA Subframe #(n+1)~LAA Subframe #(occupancy time) if the occupancies are successful. As an example, it is assumed that in step S903, the LAA node has failed to occupy radio resource for LAA Subframes #1 and LAA Subframe #2 while succeeded in step S904 in LAA Subframes #3 and LAA Subframes #4, the LAA node could use LAA Subframe #3 and LAA Subframe #4. Therefore, the LAA node would transmit data for the two successfully occupied radio resource (i.e., 2 ms). In step S905, the UE would send HARQ NACK to LTE eNB for the first two subframes (i.e., LAA Subframes #1 and LAA Subframe #2) and HARQ ACK in step S906 for LAA Subframes #3 and LAA Subframes #4. By accompanying the result of ACK/NACK reported from the UE with the occupancy notification, the LTE eNB would know the cause of HARQ NACK.

Referring to the embodiment of FIG. 9, the LTE eNB may assume that LAA node would perform occupancy mechanism for unlicensed operation frequencies in the way that the LAA node would perform occupancy in the starting time of the next possible LAA subframe (e.g., LAA subframe #(n+1)) if the LAA node failed of the occupancy (e.g. fail of the occupancy of possible LAA Subframe #n). Occupancy pattern may not be configured or coordinated with LAA nodes. LTE eNB may send DCI through PDCCH to at least one UE every subframe (i.e., per subframe). The LAA node may send data once necessary radio resources have been occupied; otherwise, LAA node may drops the data for that particular subframe (e.g., subframe content or TB with scheduling information) and consequently the UE would send a HARQ NACK to the LTE eNB.

Figure 10:
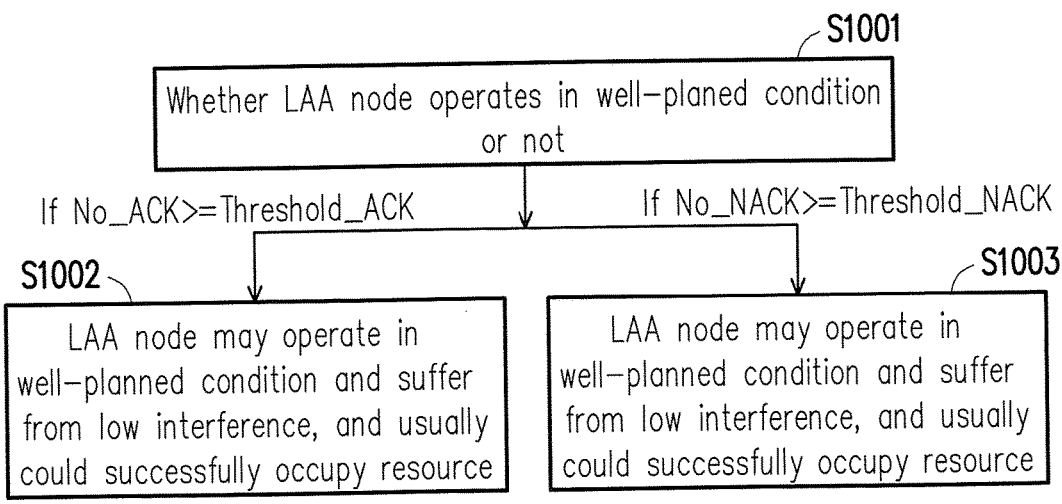
FIG. 10 illustrates classifying the deployment environment of LAA node in accordance with one of the exemplary embodiments of the disclosure.
Figure 13:
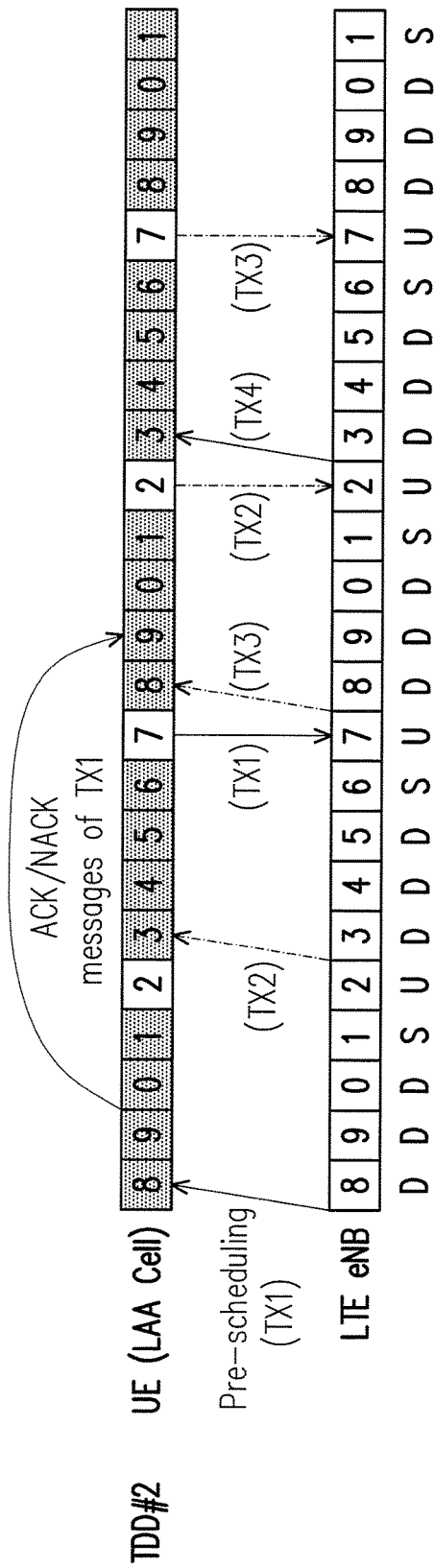
FIG. 13 illustrates the occupancy pattern of TDD configuration 2 in accordance with one of the exemplary embodiments of the disclosure.
Figure 14:
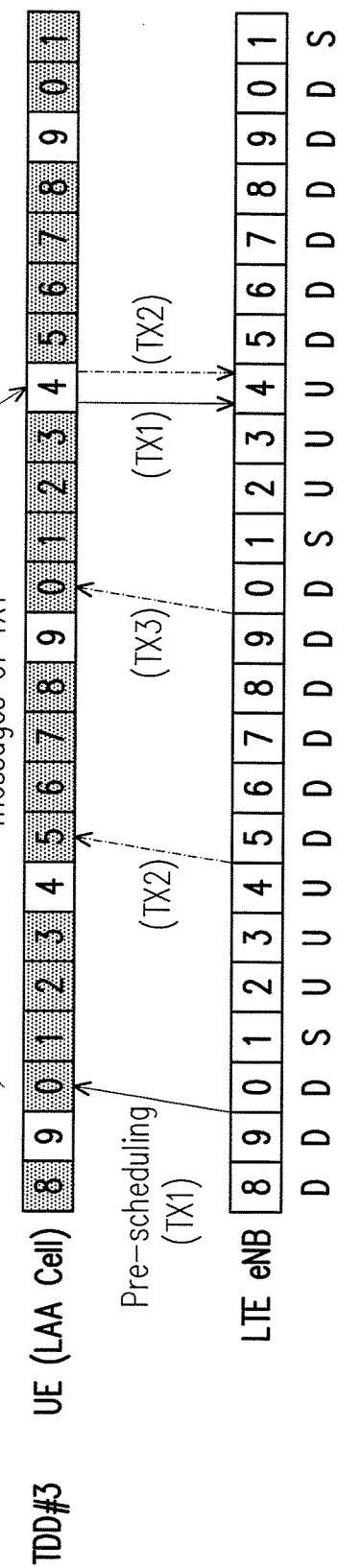
FIG. 14 illustrates the occupancy pattern of TDD configuration 3 in accordance with one of the exemplary embodiments of the disclosure.
Figure 17:
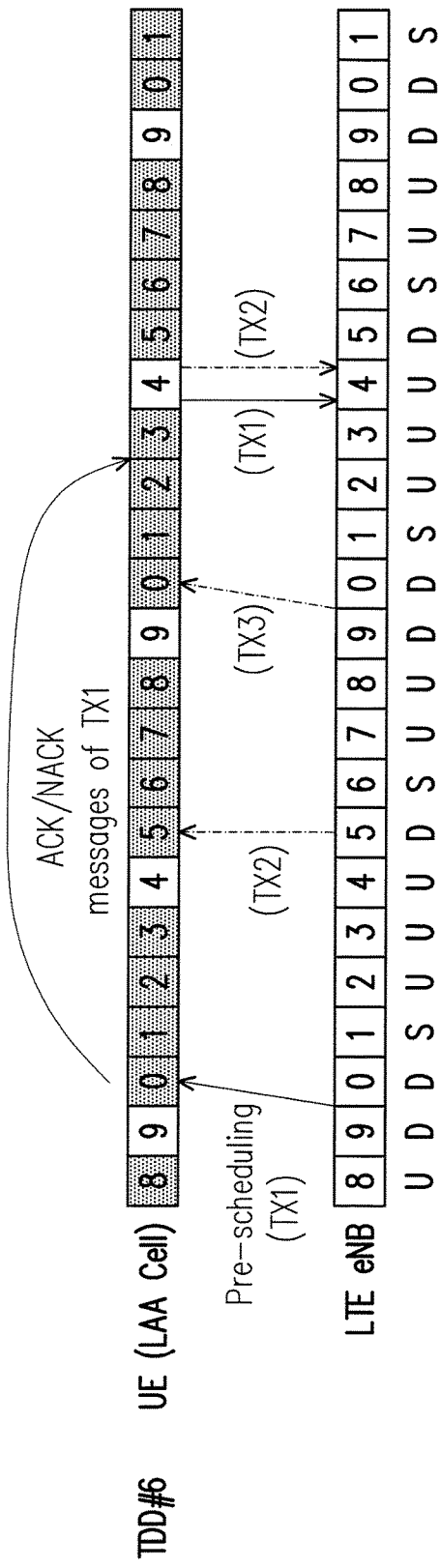
FIG. 17 illustrates the occupancy pattern of TDD configuration 6 in accordance with one of the exemplary embodiments of the disclosure.
Figure 18:
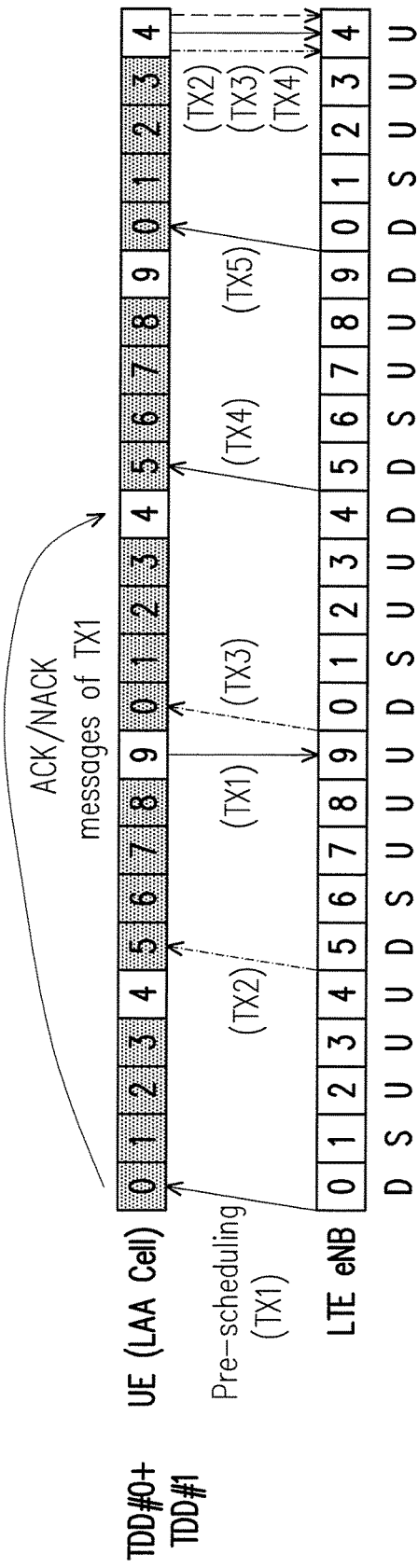
FIG. 18 illustrates the occupancy pattern of LTE eNB switching from TDD configuration 0 to configuration 1 in accordance with one of the exemplary embodiments of the disclosure.
Figure 21:
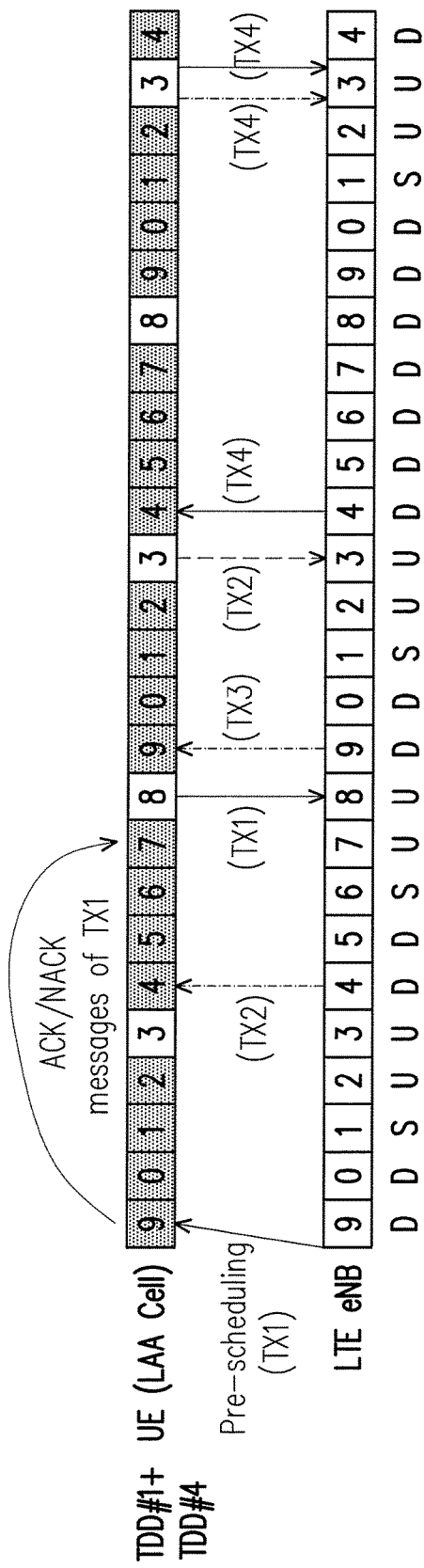
FIG. 21 illustrates the occupancy pattern of LTE eNB switching from TDD configuration 1 to configuration 4 in accordance with one of the exemplary embodiments of the disclosure.
Figure 22:
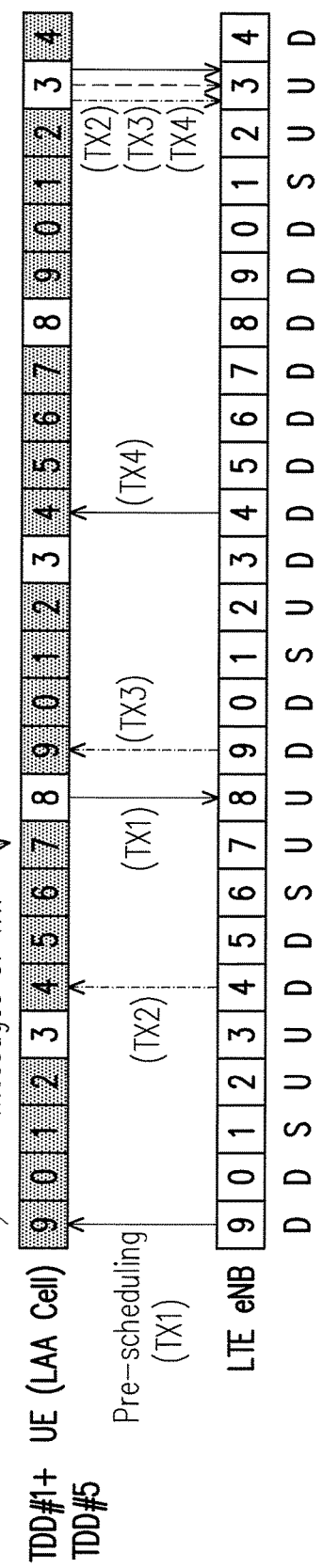
FIG. 22 illustrates the occupancy pattern of LTE eNB switching from TDD configuration 1 to configuration 5 in accordance with one of the exemplary embodiments of the disclosure.
Figure 23:
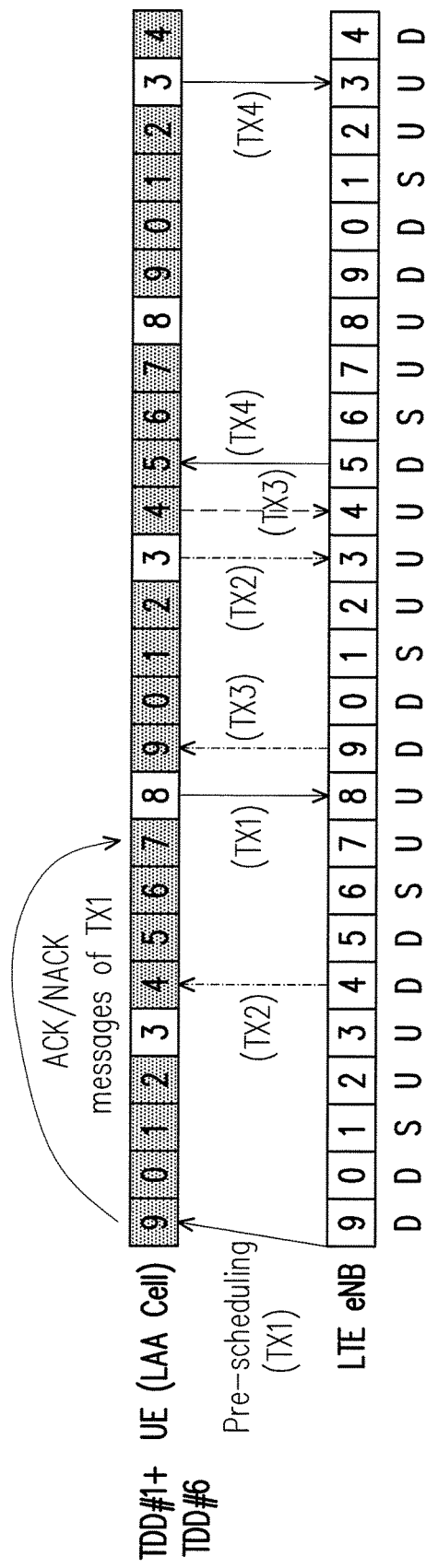
FIG. 23 illustrates the occupancy pattern of LTE eNB switching from TDD configuration 1 to configuration 6 in accordance with one of the exemplary embodiments of the disclosure.

FIG. 10 illustrates a process for a LTE eNB to classify the deployment environment of a LAA node. LTE eNB may classify the deployment environment of LAA nodes based on the following criteria: (1) HARQ ACK/NACK from UEs, (2) Occupancy notification from LAA nodes, (3) UE indication about occupancy results of LAA nodes, and (4) Measurement report from UEs. The above criteria may also help LTE eNB whether or not choose UE to use LAA cell of LAA node. In step S1001, an eNB would determine whether a LAA node operates in a well-planned condition or not according to whether the lack of ACK/NACK reported from a UE exceeds an ACK/NACK threshold. If the lack of ACK is greater or equal to an ACK threshold, then in step S1002 the eNB would determine that the LAA node may operate in a well-planned condition, suffers from low interference, and usually could succeed in occupying radio resources in an unlicensed spectrum. Similarly, if the lack of NACK reported from the UE is greater than a NACK threshold, then in step S1003 the eNB may determine that the LAA node may operate in a well-planned condition, suffers from low interference, and usually could succeed in occupying radio resources in an unlicensed spectrum.

Various Embodiments of occupancy pattern according to different time domain duplex (TDD) configurations are shown in FIGS. 11~23. These embodiments illustrates various TDD configurations in which a LTE eNB cooperates with a LAA node configured with 3 or 4 ms of occupancy time (i.e., 3 or 4 available LAA subframes for each successful occupancy).

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art. No element, act, or instruction used in the detailed description of the disclosure should be construed as critical or essential to the present disclosure unless explicitly described as such.

In view of the aforementioned descriptions, the present disclosure is suitable for being used in a wireless communication system and is able to minimize effect of the backhaul delay in order to for a base station to properly schedule radio resources in unlicensed spectrum.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of radio resource scheduling in an unlicensed spectrum implemented by a base station, the method comprising:
   transmitting, to a licensed assisted access (LAA) node, a node control information which coordinates the radio resource of the unlicensed spectrum with the LAA node and comprises an occupancy pattern of a radio resource of the unlicensed spectrum before receiving an occupancy notification, wherein the LAA node is controlled by the base station to connect a user equipment to the radio resource of the unlicensed spectrum;
   transmitting, to a user equipment, an equipment control information which indicates a packet data is to be transmitted through radio resource of the unlicensed spectrum and comprises the occupancy pattern of the radio resource of the unlicensed spectrum before receiving the occupancy notification;
   transmitting, through the LAA node the packet data to the user equipment by using the radio resource of the unlicensed spectrum before receiving the occupancy notification; and
   receiving, from the LAA node, the occupancy notification which informs that the radio resource of the unlicensed spectrum through which the packet data is transmitted has been successfully occupied.

2. The method of claim 1 further comprising:
   pre-scheduling the packet data to be transmitted over the radio resource of the unlicensed spectrum comprising:
      determining a starting subframe according to the occupancy pattern; and
      transmitting the packet data to the licensed assisted access node ahead of the starting subframe according to a delay and the occupancy pattern.

3. The method of claim 2, wherein transmitting the packet data to the licensed assisted access node further comprising:
   transmitting a downlink control information (DCI) destined toward a user equipment through a physical downlink control channel (PDCCH) for same subframe scheduling or cross subframe scheduling.

4. The method of claim 2, wherein the occupancy pattern comprises
   a consecutive period which is restricted by a regional maximum occupancy period; and
   a blank period which is used for a clear channel assessment or a random backoff period.

5. The method of claim 4, wherein transmitting the equipment control information further comprising:
   transmitting a first mapping information within the equipment control information which corresponds to a first subframe of consecutive subframes, wherein the first mapping information comprises:
      an existence bit which indicates whether the licensed assisted access node will deliver the packet data; and
      a reservation duration which indicates a duration of the consecutive subframes.

6. The method of claim 1 further comprising:
   initiating a channel occupancy mechanism for the radio resource of the unlicensed spectrum by at least one of:
      transmitting a first indicator to start a channel occupancy mechanism;
      transmitting the occupancy pattern; and
      transmitting the packet data.

7. The method of claim 6, further comprising:
   stopping the channel occupancy mechanism for the radio resource of the unlicensed spectrum by at least one of:
      transmitting a second indicator to stop a channel occupancy mechanism; and
      transmitting no packet data.

8. The method of claim 4 further comprising:
   receiving a ACK signal or a NACK signal for each subframe in the consecutive period; and
   determining a cause of failure based on the NACK signal and the occupancy notification.

9. The method of claim 8 further comprising:
   in response to a NACK signal being received, the cause of failure is determined to be an occupancy failure if the occupancy notification indicates that the radio resource of the unlicensed spectrum is not available, and the packet data is determined to be a new transmission due to the occupancy failure; and
   in response to a NACK being received, the cause of failure is determined to be a non-occupancy related failure if the occupancy notification indicates that the radio resource of the unlicensed spectrum is available and the packet data is determined to be a retransmission due to the non-occupancy related failure.

10. The method of claim 1 further comprising:
in response to receiving the occupancy notification indicating that the radio resource of the unlicensed spectrum is available, transmitting the packet data through a configured scheduling message to schedule another consecutive subframes.

11. The method of claim 1, wherein the node control information further comprises at least one or a combination of: a delay, a synchronization information, a transmission power, a channel number, and an indication to start or stop performing channel occupancy.

12. The method of claim 1, wherein the equipment control information further comprises at least one or a combination of: a frequency band, a channel number, a LAA cell index or identification (ID), and a delay.

13. The method of claim 1, wherein the occupancy pattern is determined according to either a frequency domain duplex (FDD) configuration or one of time domain duplex configurations (TDDs).

14. A method of radio resource scheduling in an unlicensed spectrum implemented by a licensed assisted access (LAA) node, the method comprising:
receiving, from a base station, a node control information which is to coordinate uses the radio resource of the unlicensed spectrum by the base station and comprises an occupancy pattern of a radio resource of the unlicensed spectrum before transmitting an occupancy notification;
after receiving the node control information, receiving a packet data which uses the radio resource of the unlicensed spectrum before transmitting the occupancy notification;
determining that the radio resource of the unlicensed spectrum through which the packet data has been transmitted is successfully occupied; and
transmitting the occupancy notification to inform the base station that the radio resource of the unlicensed spectrum through which the packet data has been transmitted is successfully occupied.

15. The method of claim 14 further comprising:
Transmitting, to a user equipment, the packet data if the radio resource of the unlicensed spectrum is determined to be available; and
discarding the packet data if the radio resource of the unlicensed spectrum is determined to be not available.

16. The method of claim 15 further comprising:
receiving a downlink control information (DCI) destined toward a user equipment through a physical downlink control channel (PDCCH) for either same subframe scheduling or cross subframe scheduling.

17. The method of claim 15, wherein the occupancy pattern comprises
a consecutive period which is restricted by a regional maximum occupancy period; and
a blank period which is used for a clear channel assessment or a random backoff period.

18. The method of claim 17 further comprising: receiving an equipment control information which comprises a first mapping information which corresponds to a first subframe of consecutive subframes, wherein the first mapping information comprises:
an existence bit which indicates whether the licensed assisted access node will deliver the packet data; and
a reservation duration which indicates a duration of the consecutive subframes.

19. The method of claim 14 further comprising:
performing a channel occupancy mechanism for a radio resource of the unlicensed spectrum in response to at least one of:
receiving a first indicator to start a channel occupancy mechanism;
receiving the occupancy pattern; and
receiving the packet data.

20. The method of claim 19, further comprising:
stopping the channel occupancy pattern for the radio resource of the unlicensed spectrum in response to at least one of:
receiving a second indicator to stop a channel occupancy mechanism; and
receiving no packet data.

21. The method of claim 14 further comprising:
in response to transmitting the occupancy notification indicating that the radio resource of the unlicensed spectrum is available, receiving the packet data through a configured scheduling signaling to schedule another consecutive subframes.

22. The method of claim 14 further comprising:
transmitting a reservation signal to reserve the radio resource of the unlicensed spectrum in response to having occupied the radio resource of the unlicensed spectrum before setting a transmission time for the packet data.

23. The method of claim 14, wherein the node control information further comprises at least one or a combination of: a delay, a synchronization information, a transmission power, a channel number, and an indication to start or stop performing channel occupancy.

24. A base station comprising:
a transmitter;
a receiver; and
a processor coupled to the transmitter and the receiver and is configured at least for:
transmitting, to a licensed assisted access (LAA) node via the transmitter, a node control information which coordinates the radio resource of the unlicensed spectrum with the LAA node and comprises an occupancy pattern of a radio resource of an unlicensed spectrum before receiving an occupancy notification;
transmitting, to a user equipment, via the transmitter, an equipment control information which indicates a packet data is to be transmitted through radio resource of the unlicensed spectrum and comprises the occupancy pattern of the radio resource of the unlicensed spectrum before receiving an occupancy notification;
transmitting, through the LAA node via the transmitter, to the user equipment the packet data by using the radio resource of the unlicensed spectrum before receiving the occupancy notification; and
receiving, from the LAA node via the receiver, the occupancy notification which informs that the radio resource of the unlicensed spectrum through which the packet data has been transmitted is successfully occupied.

25. A licensed assisted access node comprising:
a first transceiver; and
a processor coupled to the first transceiver and is configured at least for:
receiving, from a base station, via the first transceiver, a node control information which is to coordinate uses the radio resource of the unlicensed spectrum by the base station and comprises an occupancy pattern of a radio resource of an unlicensed spectrum before transmitting an occupancy notification;

after receiving the node control information, receiving, via the first transceiver, a packet data which uses the radio resource of the unlicensed spectrum before transmitting the occupancy notification;

determining that the radio resource of the unlicensed spectrum through which the packet data is transmitted is successfully occupied; and transmitting, via the first transceiver, the occupancy notification to inform the base station that the radio resource of the unlicensed spectrum through which the packet data has been transmitted is successfully occupied.

* * * * *